(12) United States Patent
Shapiro

(10) Patent No.: US 6,220,611 B1
(45) Date of Patent: Apr. 24, 2001

(54) COLLAPSIBLE COMPACT CART WITH PIVOTING WHEEL CONSTRUCTION

(76) Inventor: Richard N. Shapiro, 2248 Haversham Close, Virginia Beach, VA (US) 23454

( * ) Notice: Subject to any disclaimer, the term of this patent is extended or adjusted under 35 U.S.C. 154(b) by 0 days.

(21) Appl. No.: 09/271,274

(22) Filed: Mar. 17, 1999

(51) Int. Cl.[7] .................................................... B62B 3/02
(52) U.S. Cl. ...................................... 280/47.34; 280/651
(58) Field of Search ............................. 280/30, 639, 656, 280/659, 47.19, 47.26, 47.34, 47.371, 35, 37, 40, 651, 655, 655.1, 79.2, 79.4, 646, 47.35, 47.18, 47.11, 47.315

(56) References Cited

U.S. PATENT DOCUMENTS

| | | |
|---|---|---|
| 2,350,062 | 5/1944 | Mosier . |
| 2,688,493 * | 9/1954 | Rosenberg .......................... 280/651 |
| 2,879,072 * | 3/1959 | Rear et al. ............................ 280/40 |
| 2,984,499 | 5/1961 | Humphrey . |
| 4,109,926 | 8/1978 | Lane . |
| 4,355,818 * | 10/1982 | Watts ................................... 280/654 |
| 4,765,643 | 8/1988 | Pappanikolaou . |
| 4,856,810 | 8/1989 | Smith . |
| 4,887,836 | 12/1989 | Simjian . |
| 4,889,360 | 12/1989 | Havlovitz . |
| 5,028,060 * | 7/1991 | Martin .................................. 280/39 |
| 5,203,815 * | 4/1993 | Miller ................................... 43/21.2 |
| 5,228,706 * | 7/1993 | Boville ............................... 280/43.22 |
| 5,299,826 * | 4/1994 | Flowers ............................... 280/651 |
| 5,306,029 * | 4/1994 | Kaiser, II .............................. 280/30 |
| 5,330,212 * | 7/1994 | Gardner ................................ 280/40 |
| 5,373,708 * | 12/1994 | Dumoulin, Jr. ..................... 62/457.7 |
| 5,465,985 * | 11/1995 | Devan et al. ......................... 280/30 |
| 5,484,046 * | 1/1996 | Alper et al. ......................... 190/115 |
| 5,660,296 * | 8/1997 | Greenwich .......................... 220/326 |
| 5,692,761 | 12/1997 | Havlovitz . |
| 5,839,738 * | 11/1998 | Ozark ................................... 280/30 |
| 5,857,695 * | 1/1999 | Crowell .............................. 280/651 |
| 5,887,879 * | 3/1999 | Chumley .............................. 280/40 |

* cited by examiner

Primary Examiner—Brian L. Johnson
Assistant Examiner—Bridget Avery
(74) Attorney, Agent, or Firm—Larson & Taylor, PLC

(57) ABSTRACT

A wheeled carrier device is provided which includes a plurality of foldable walls supported on a base member and movable between an erected state wherein the walls define a carrier space and a collapsed state wherein the walls are folded on top of the base member. The carrier device has at least two wheels and a wheel mounting assembly pivotably mounts the wheels on the device on opposite sides thereof such that the wheels are movable through 270° from a first, operative position wherein the wheels support the carrier device and a second, inoperative position wherein the wheels are folded over on top of the folded walls in the collapsed state thereof. A handle is affixed to the carrier device and is movable between an operative state wherein the handle can be used to pull the carrier device and an inoperative state wherein the handle is stowed in substantially flush relation with the remainder of the carrier in the collapsed state of the walls.

38 Claims, 27 Drawing Sheets

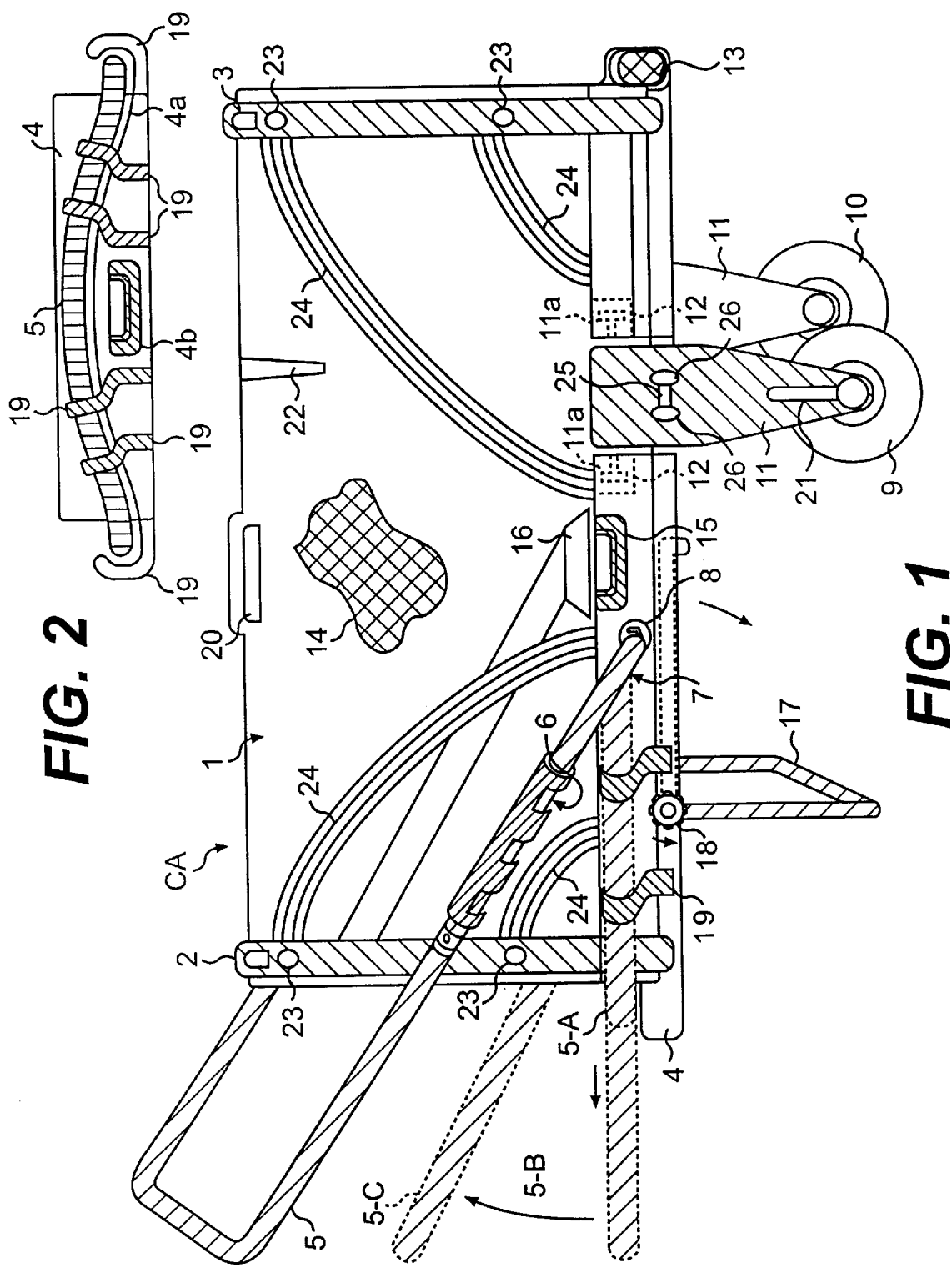

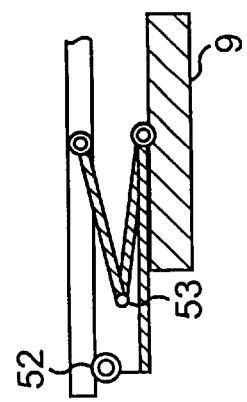
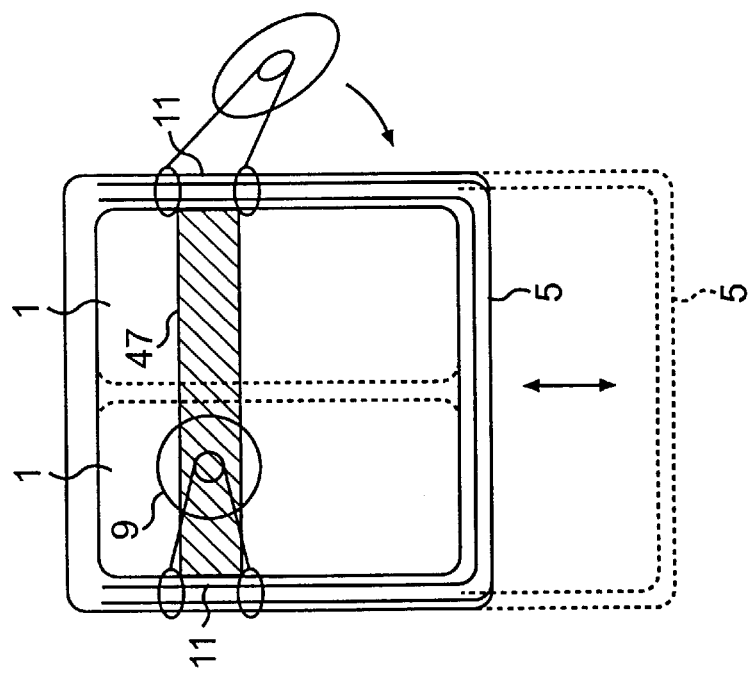
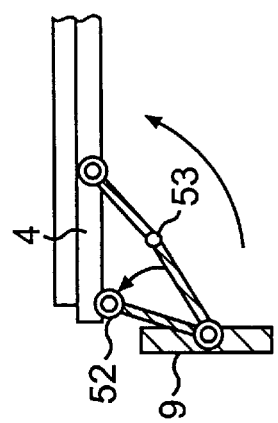
FIG. 8
FIG. 9A
FIG. 9B

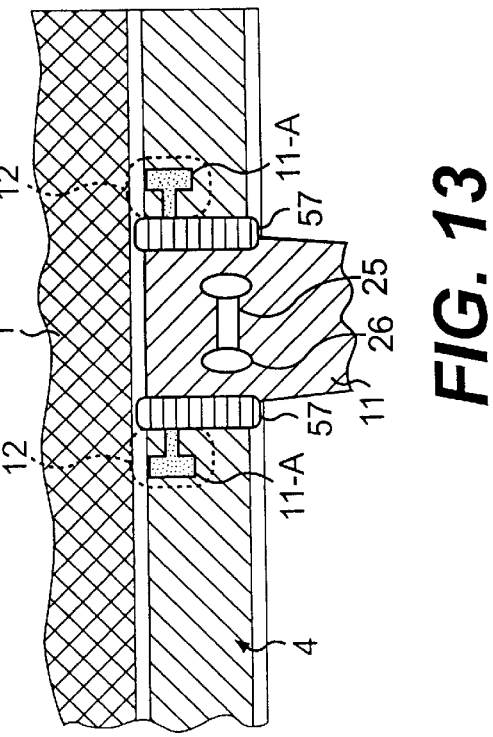
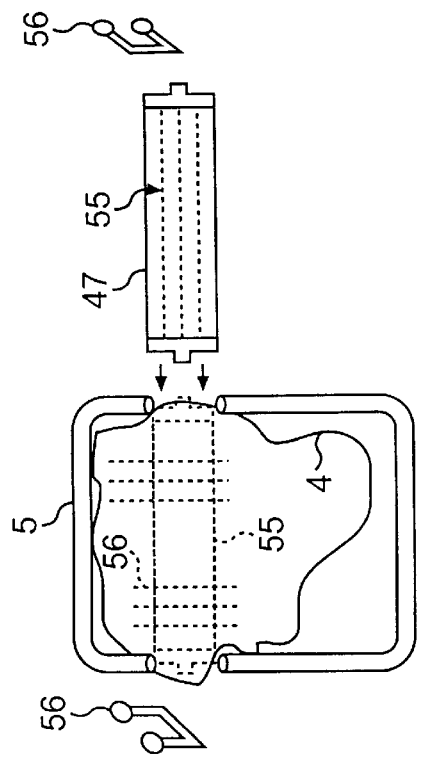
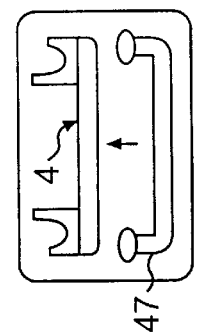

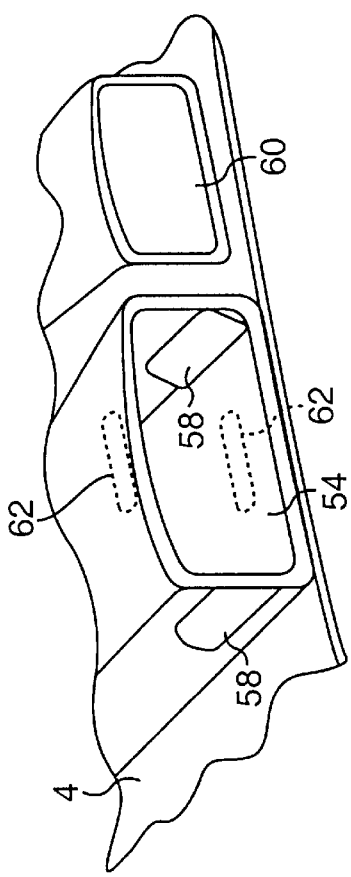
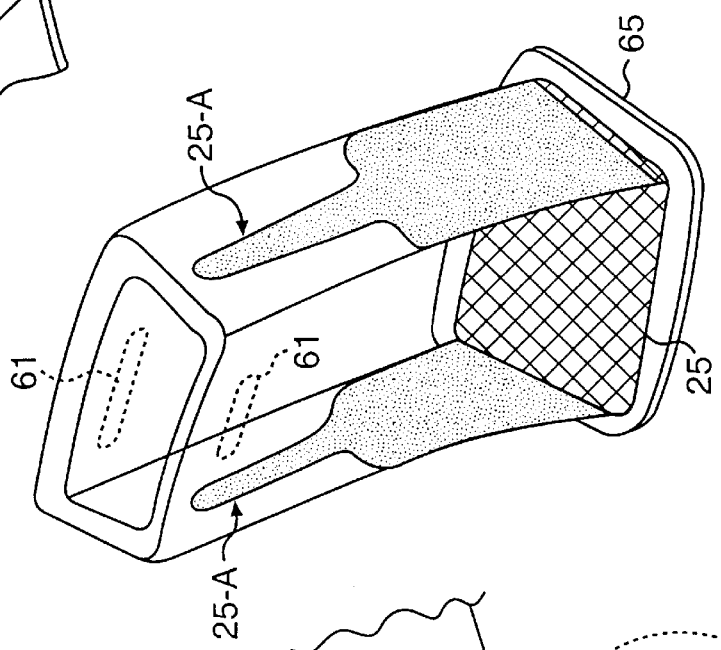
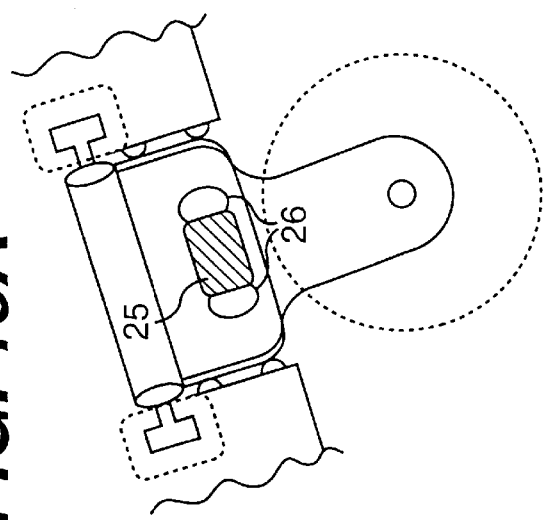

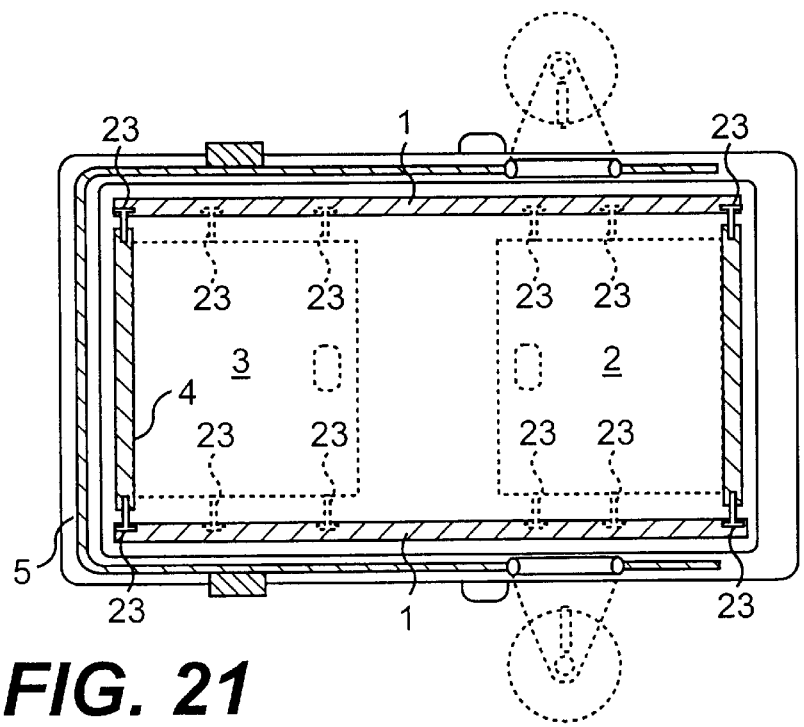
FIG. 21
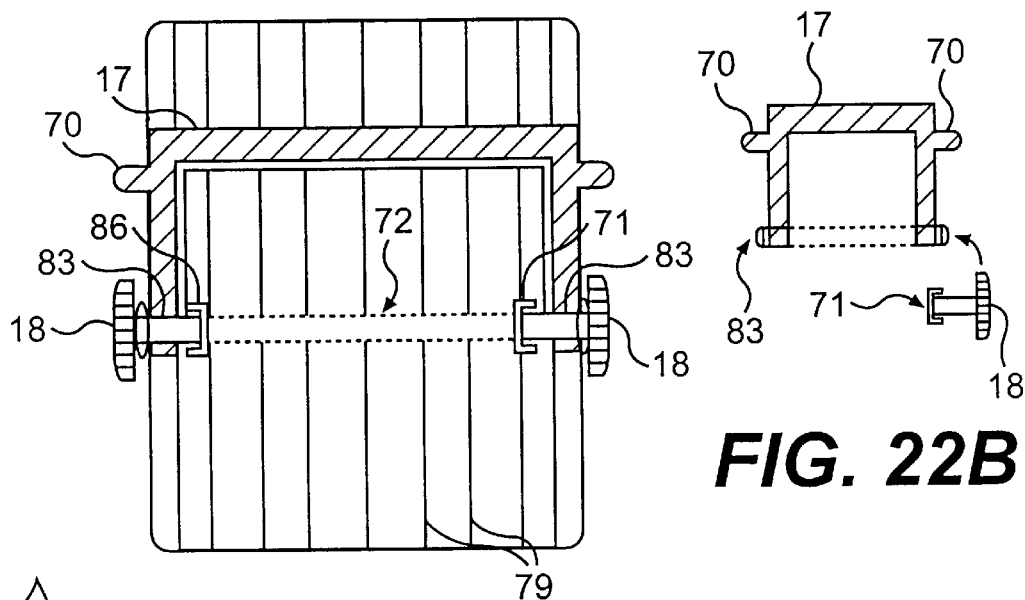
FIG. 22A
FIG. 22B
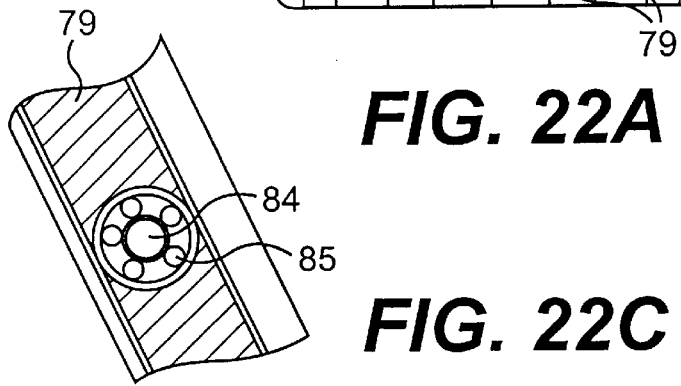
FIG. 22C

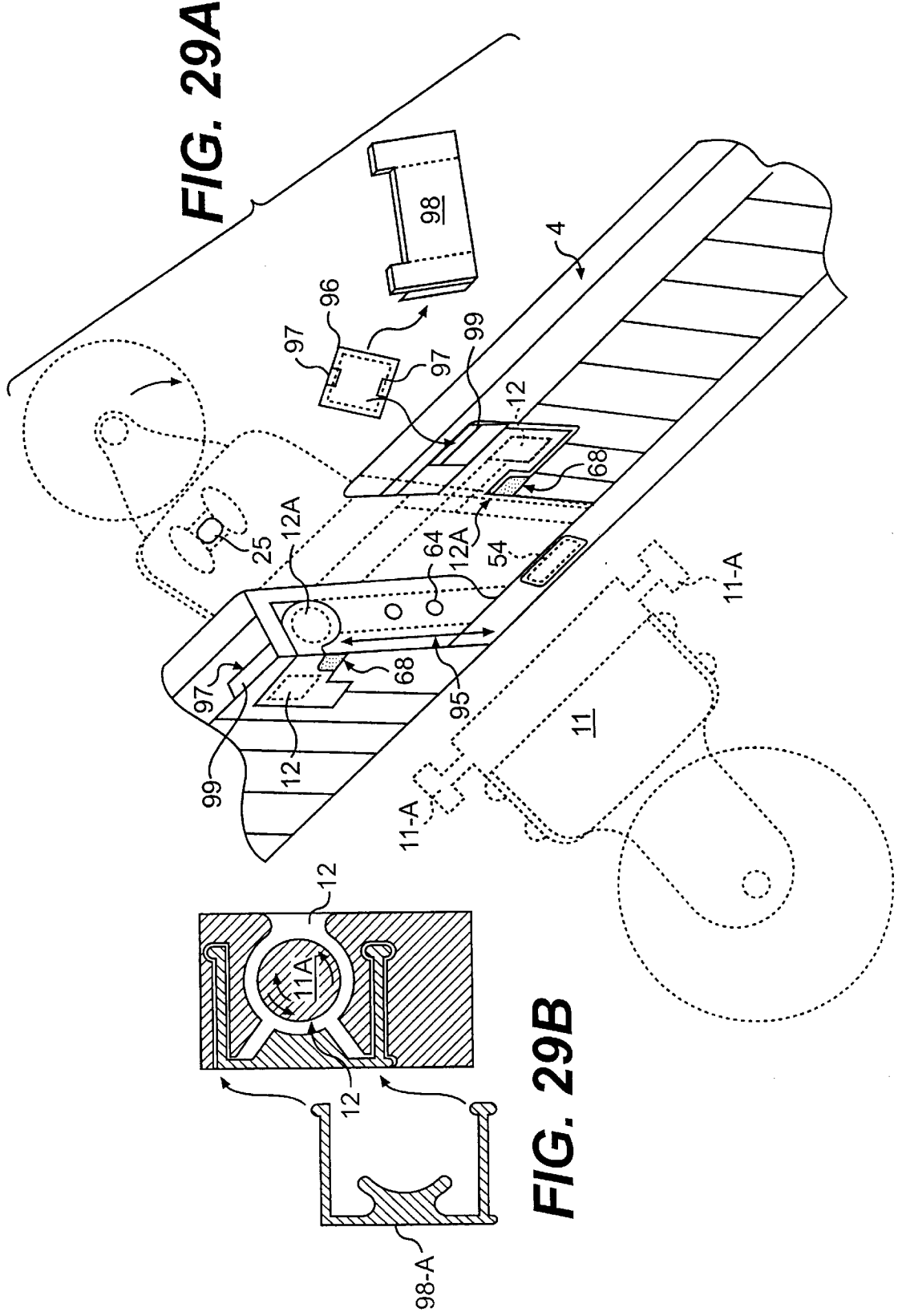

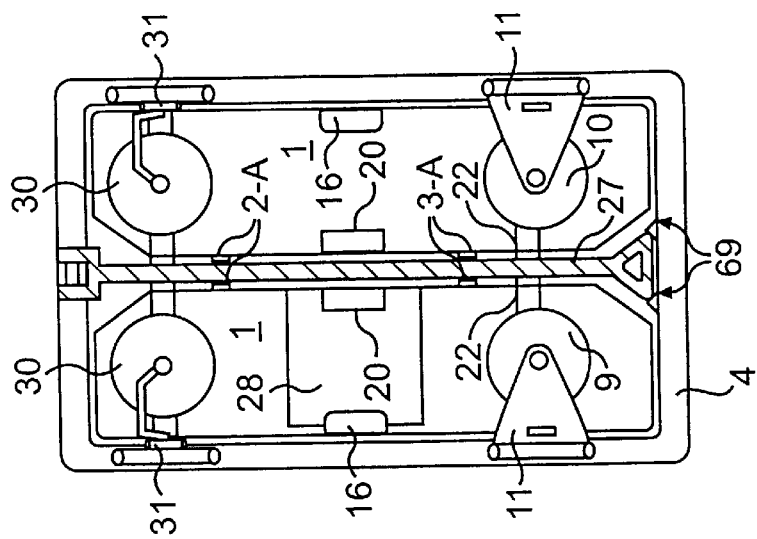
FIG. 31
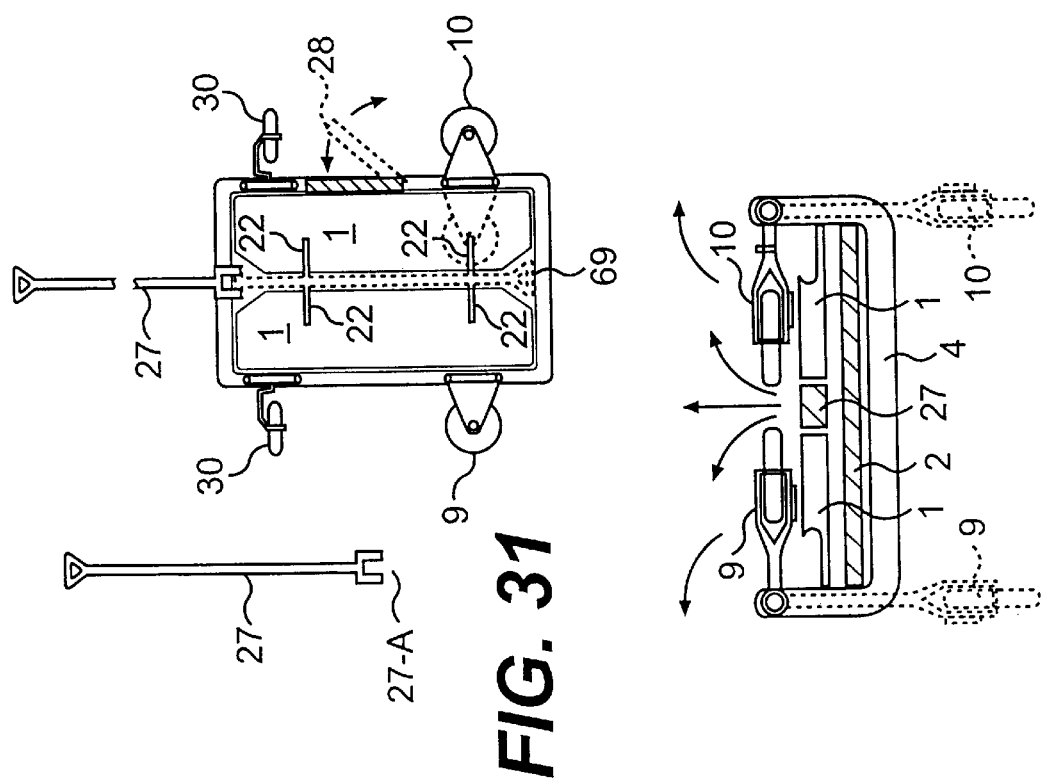
FIG. 32
FIG. 33

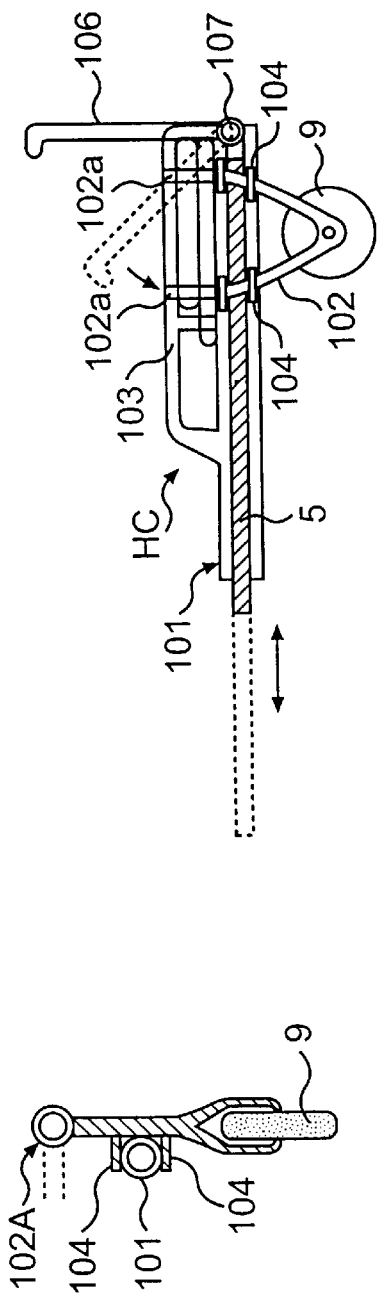
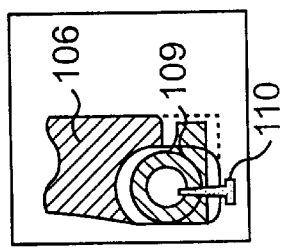
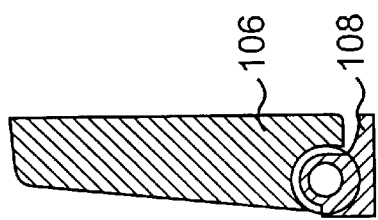
FIG. 36
FIG. 36A
FIG. 36B
FIG. 36C

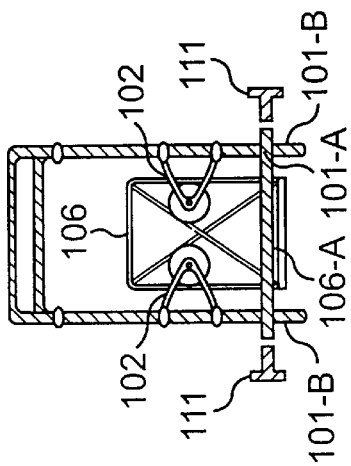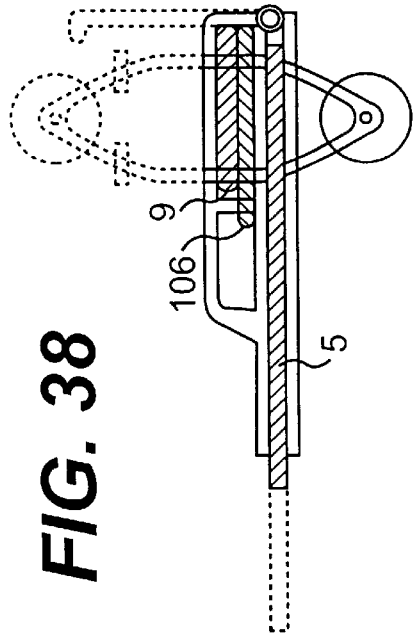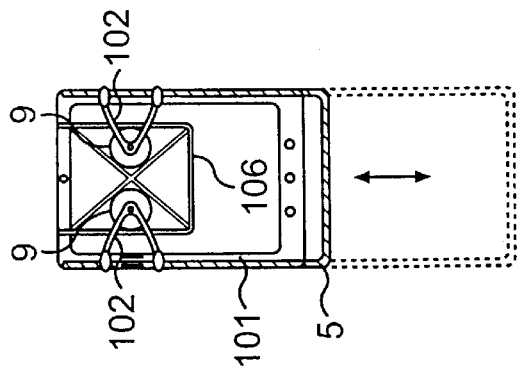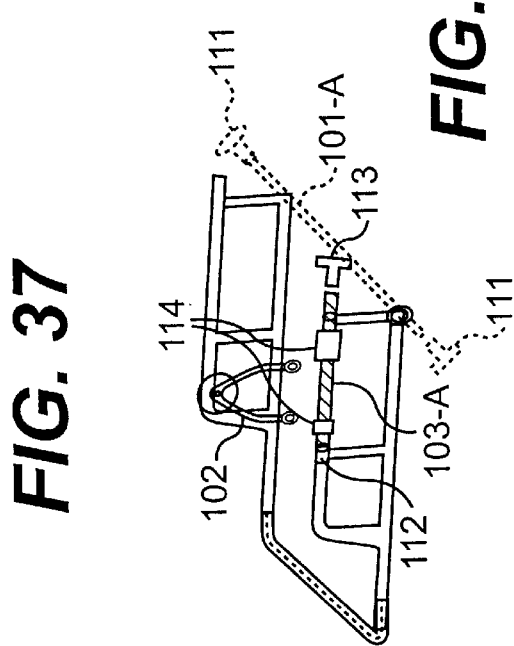

COLLAPSIBLE COMPACT CART WITH PIVOTING WHEEL CONSTRUCTION

FIELD OF THE INVENTION

The present invention relates to wheeled carts, wagons and like carrier devices and, more particularly, to a collapsible wheeled carrier device which folds or collapses down to a very thin profile.

BACKGROUND OF THE INVENTION

Consumers have increasingly placed a premium on compact yet durable, space saving devices which move cargo, a fact that is easily demonstrated by the exponential growth in wheeled luggage devices using recessing, telescoping handles, as well as the ever expanding number of utility carts and four wheel wagons providing folding or recessing handles. It is often the stated object of many of these latter mentioned cart or wagon devices to provide for a simple design which includes a folding or recessing handle structure, thereby allowing for easier transport of devices, e.g., in a car trunk, or to allow for compact display or storage. However, in actuality, there is little that is compact or space-saving in most of these devices which characteristically incorporate a fixed or one piece cargo area or "well," and set of two or four wheels which are affixed to an axle, and which provide no method for any of the wheels to fold or recess in a space saving manner. In general, merely recessing or folding a handle structure alone goes a very little way in creating a truly space-saving cart or wagon device.

Over many years, countless designs have been proposed for folding or collapsing rolling carts and wagons. Most suffer from a number of problems, including those relating to difficulty of manufacture, the need for many detachable parts, or difficulty in use, i.e., the requirement for non-intuitive actions by a consumer in order to determine how to collapse or set-up the cart or wagon. For example, see U.S. Pat. No. 4,109,926 (Lane), U.S. Pat. No. 4,856,810 (Smith), U.S. Pat. No. 4,765,643 (Pappanikolaou). Previous patents have also generally disclosed folding side, front and rear walls which fold or collapse in various fashions (see, e.g., U.S. Pat. No. 4,887,836 (Simjian)).

Further, numerous patents have described methods to fold or nest cart or wagon handles using various methods, including articulating joints, detachable handles, or pivoting handle structures. For example, see U.S. Pat. No. 2,350,062 (Mosier), U.S. Pat. No. 2,984,499 (Humphrey), U.S. Pat. No. 4,889,360 (Havlovitz) and U.S. Pat. No. 5,692,761 (Havlovitz). The devices of the Havlovitz patents are notable for the simplicity of their design and both include a folding handle. The primary deficiency of the devices of the Havlovitz Patents, despite their simplicity, is that the devices are not truly compact designs. Moreover, in the latter patent, it is quite awkward for the consumer to fold the handle down, since this requires lifting of the entire cart off the ground to achieve the recess handle position. The prior art also discloses wheel support arms which pivot through, in general, 90° along an axis adjacent to the base or underside of the wheeled device, but, in general, such wheels support arms must be folded out from the underside of the device and generally require some other interfitting device or part to cooperate with the wheel support arms to "lock" or resiliently retain the pivoting wheel structure in place.

In general, the invention overcomes a large number of deficiencies and disadvantages in the prior art carts and wagons. It is believed that these deficiencies and disadvantages have prevented the manufacture of a truly compact, space saving wheeled device having a very thin profile. The invention also provides a folding cart or wagon which is simple to assemble and manufacture, which sets up in seconds, which includes a minimum number of separate parts, which has no part which normally detaches, which is very simple to operate properly, and which does not require a consumer to occupy an awkward position to set up.

Objects of the invention include the following: to provide a unique 270° pivoting wheel and wheel support structure which may be used with several different types of support arm structures, including the provision of retention means between the support arm structure and the base and/or walls of the various two or four-wheel devices described hereinbelow; to provide a unique ultra-flat, compact and space saving construction which involves recessing of a generally "U" shaped handle (or two straight handles) into the profile of such a device, as well as in the provision of cooperating sleeves constructed as a part of the folding side walls, to provide that the handle, whether generally "U" shaped or in the form of two straight handles, telescopes and engages the outer portion of the cart base along a slide path, is provided with detents so that the handle may recess directly inside a sleeve or cylinder around which a pivoting wheel support structure pivots; to provide several alternative embodiments for a simple kickstand or other underside support for the device; to provide for cooperation and interlocking between the walls of the cart in the movement thereof between their folded raised position, to further provide a four-wheel wagon or cart embodiment which includes a center pull handle which folds and nests flat into the base or bed of the wagon, and provide for a zippered carry bag made of a mesh, or other suitable material, which is capable of being rolled up and stored in a storage cavity provided in either end of the base of the cart, as well as a shoulder strap for transporting the collapsed cart, and to provide for a fold-down drink and/or implement holder as a part of a wall of the wagon or cart, to provide for a number of alternative wheel structures and support arm structures, and to provide a number of base underside strengthening and support embodiments, as well as other important improvements as further described hereinafter.

According to one aspect of the invention, a wheeled carrier device is provided which comprises a base member; a plurality of foldable walls supported on the base member and movable between an erected state wherein the walls define a carrier space and a collapsed state wherein the walls are folded on top of the base member; at least two wheels; and wheel mounting means for pivotably mounting the at least two wheels on the device on opposite sides thereof such that the at least two wheels are movable through 270° from a first, operative position wherein the wheels support the carrier device and a second, inoperative position wherein the wheels are folded over on top of the folded walls in the collapsed state of the latter.

Preferably, the wheeled carrier device further comprises a handle affixed to the carrier device and movable between an operative state wherein the handle can be used to pull the carrier device and an inoperative state wherein the handle is stowed in substantially flush relation with the remainder of the carrier in the collapsed state of the walls.

In one preferred embodiment of the handle, the handle comprises a substantially U-shaped handle member including parallel arms pivotably connected to the carrier device. The foldable walls include side walls and these side walls preferably each include handle receiving means for supporting the parallel arms in the operative state of the handle. The parallel arms of said U-shaped handle member advantageously comprise telescoping arm elements which telescope between an extended position in the operative state of the handle and a retracted position in the inoperative state of the handle. The handle member further comprises releasable means for retaining the telescoping arm elements in the retracted state thereof.

In a further preferred embodiment thereof, the handle preferably comprises an elongate handle member pivotably connected to one end of the carrier device and movable to a folded down storage position wherein the handle extends longitudinally of the carrier device in the collapsed state of the walls.

In an advantageous embodiment, the walls comprise first and second spaced, parallel walls and third and fourth spaced, parallel walls extending orthogonally to the first and second walls, the first and second walls each having and inwardly facing surface including at least one curved channel therein at each end thereof extending between side and bottom edges thereof, and the third and fourth walls including projecting elements received in the channels for enabling a downward folding movement of the third and fourth walls to collapsed positions wherein the third and fourth walls fold down on the base member.

The wheel mounting means preferably includes a wheel support member including oppositely extending mounting elements and the base member of the carrier device preferably includes spaced, opposed cavities therein in which the mounting elements are pivotably received. The wheel mounting means preferably includes manually operable releasable means for, when engaged, serving to retain the at least two wheels in the operative position thereof.

In an embodiment wherein the carrier device has two wheels the carrier device further comprises an erectable support element affixed to the carrier device in spaced relation to the two wheels for, when erected, supporting the base member of the carrier device in a substantially horizontal position. In a preferred implementation, the erectable support element comprises a U-shaped support member including support arms pivotably connected to the base member and pivotably to a nested position with respect to the base member.

Advantageously, the wheeled carrier device further comprises an erectable tray element for, when erected, providing a support surface.

The wheeled carrier device preferably further comprises means defining an elongate storage space at one end of the device, and a rollable carrier bag stowable in said storage space.

In an embodiment wherein the cart has four wheels, two of the wheels, in the operative state thereof, are rotatable through 360° beneath the base member.

According to a further aspect of the invention, a wheeled carrier device is provided which comprises a base member; a plurality of foldable end walls and side walls supported on said base member and movable between an erected state wherein said walls define a carrier space and a collapsed state wherein the walls are folded on top of said base member; at least two wheels; and a handle affixed to the carrier device and movable between an operative state wherein the handle can be used to pull the carrier device and an inoperative state wherein the handle is stowed in substantially flush relation with the remainder of the carrier in the collapsed state of said walls, the handle including handle arms disposed on opposite sides of the side walls, and the side walls each including handle arm receiving means for supporting the handle arms in the operative state of said handle.

As set forth above, the handle advantageously comprises a substantially U-shaped handle member and the handle arms comprise parallel arms of the U-shaped handle member pivotably connected to the carrier device. As in the first aspect of the invention, the walls preferably comprise first and second spaced, parallel walls and third and fourth spaced, parallel walls extending orthogonally to the first and second walls, said first and second walls each having an inwardly facing surface including at least one curved channel therein at each end thereof extending between side and bottom edges thereof, and the third and fourth walls including projecting elements received in the channels for enabling a downward folding movement of the third and fourth walls to collapsed positions wherein said third and fourth walls fold down on the base member.

Similar to the first aspect of the invention, each wheel mounting means includes a wheel support member including oppositely extending mounting elements and the base member of the carrier device includes spaced, opposed cavities therein in which the mounting elements are pivotably received.

In accordance with a third aspect of the invention, a wheeled carrier device is provided which comprises: a base member; a plurality of foldable end walls and side walls supported on said base member and movable between an erected state wherein said walls define a carrier space and a collapsed state wherein the walls are folded on top of said base member; at least two wheels; and a handle affixed to the carrier device and movable between an operative state wherein the handle can be used to pull the carrier device and an inoperative state wherein the handle is stowed in substantially flush relation with the remainder of the carrier in the collapsed state of said walls, the handle comprising an elongate handle member pivotably connected to the carrier device at one end thereof centrally of said one end and being pivoted back, in said operative state, to a folded down position between the folded side walls in the collapsed state of the side walls.

Further features and advantages of the present invention will be set forth in, or apparent from, the detailed description of preferred embodiments thereof which follows.

BRIEF DESCRIPTION OF THE DRAWINGS

FIG. 1 is a side elevational view, partially in section and partially broken away, of a first preferred embodiment of the collapsible cart of the invention;

FIG. 2 is a front elevational view of a portion of the cart of FIG. 1;

FIG. 8 is a schematic top plan view showing folding of the wheels;

FIGS. 9A and 9B are side elevational views of an alternative wheel support arrangement;

FIG. 12 is a plan view of an alternative cart base construction;

FIGS. 12A and 12B show alternative embodiments of details of FIG. 12;

FIG. 13 is a side elevational view, partially broken away, of one embodiment of the wheel support structure;

FIGS. 15A, 15B, 15C and 15D show details of the wheel support structure;

FIG. 21 is a top plan view of another cart embodiment;

FIGS. 22A, 22B and 22C show details of a further kickstand embodiment;

FIGS. 29A and 20B are a perspective view and cross sectional view, respectively, showing details of a cover plate construction;

FIG. 31 is a top plan view showing details of one handle embodiment;

FIG. 32 is an end elevation view of the embodiment of FIG. 31, showing the handle nested and walls folded;

FIG. 33 is a top plan view of the embodiment of FIG. 31, showing further details;

FIG. 36 is a side elevational view of an alternative frame construction;

FIGS. 36A, 36B and 36C show details of the alternative frame construction of FIG. 36;

FIG. 37 is a top plan view of the embodiment of FIG. 36;

FIG. 38 shows a further embodiment of FIG. 36;

FIG. 39 shows further details of the embodiment of FIG. 38;

FIG. 40 is an exploded side elevational view showing further details;

DESCRIPTION OF THE PREFERRED EMBODIMENTS

Figure 3:
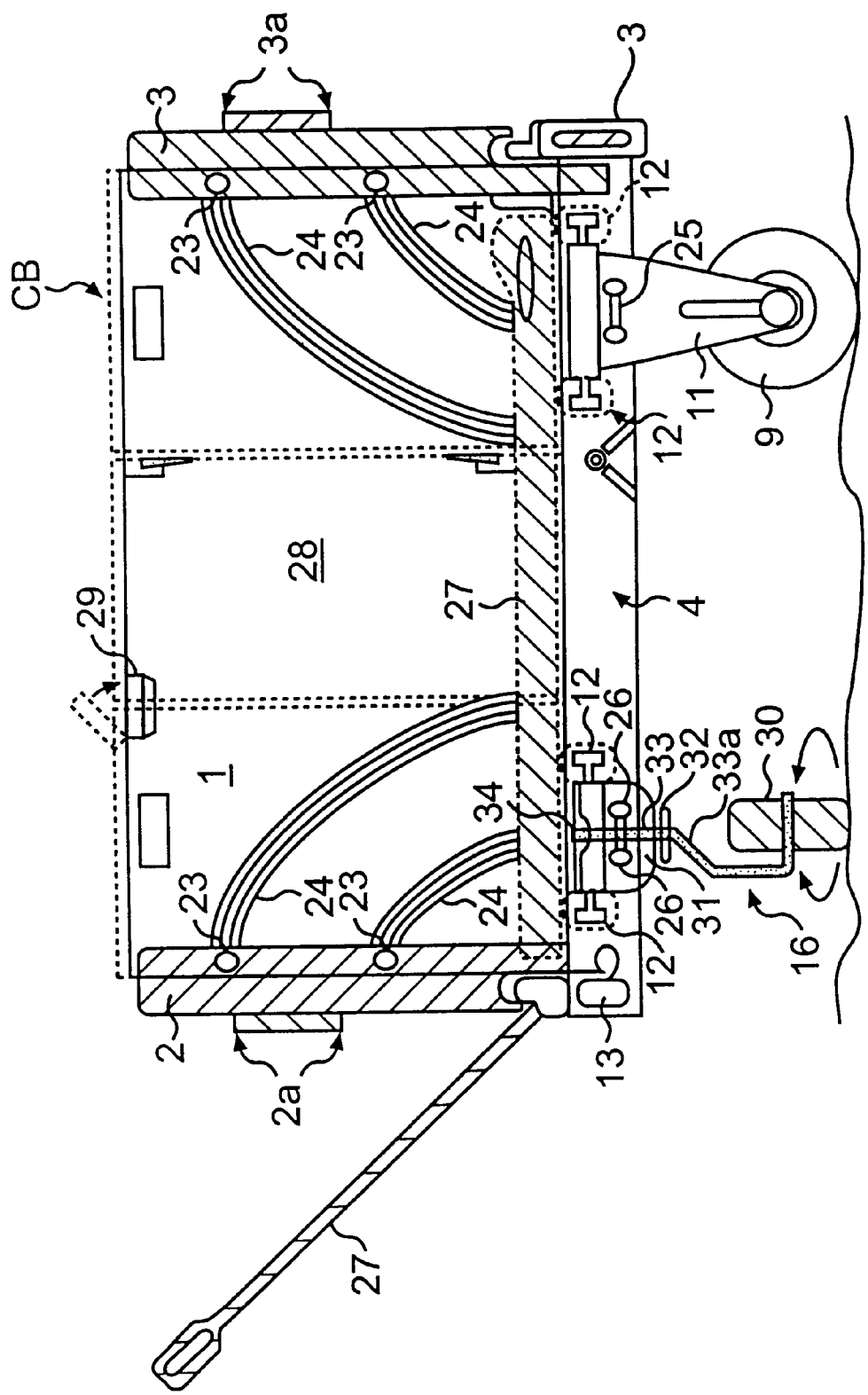
FIG. 3 is a side elevational view, partially in section and partially broken away, of a further preferred embodiment of the cart of the invention.

Referring to the drawings, FIG. 1 shows a two-wheeled cart, generally denoted CA, in a completely assembled or set-up state. The same cart CA, when folded, in the preferred embodiment, has a thickness of about the length of a credit card, and includes two side walls (one of which, denoted 1, is shown in FIG. 1) and front and rear walls 2 and 3. A base 4 has slightly elevated exterior base perimeter walls. A generally "U" shaped telescoping handle 5, constructed of extruded aluminum, another metal or any suitable plastic, is shown in solid lines in FIG. 1 in a final, upwardly secured, operative position of the handle 5 wherein handle 5 resiliently fits snugly into one or more sleeves or support sockets 6 molded into each side wall 1 of the cart. In operation, when the recessed, nested handle 5 (shown in dashed lines at 5-A) is pulled forward so that the handle 5 telescopes until it reaches a telescoped locked position, shown in dashed lines at 5-B, handle 5 is further lifted, as shown in dashed lines at 5-C, and is ultimately secured into support sockets 6 provided on the side walls in the position shown in solid lines. This allows the "U" shaped handle 5 to serve as a lifting element for raising the cart up off of a kickstand 17, and thus enables the cart CA to be propelled forward on two wheels 9 and 10, mounted on cart CA in a manner described below.

Referring further to FIG. 1, which shows one of the two side wall sleeves or sockets 6 which resiliently secure the handle 5 in place in the telescoped state thereof, the sleeves 6 being preferably molded and incorporated into the side wall construction. It is contemplated that matching recesses, grooves or other matching structures (not shown) between the handle 5 and sleeves 6 will be used to further resiliently hold the handle 5 and sleeves 6 together. An end point 7, where the two telescoping handle sections of handle 5 meet when both are recessed, is secured into a recess 8 in the cart base wall 4. Protrusions or projections 23 provided in spaced relation along the outer edge of the front wall 2 and the outer edge of back wall 3 cooperate with cooperating curved grooves or recesses 24 in the cart side walls 1. After dropping each of the wheels 9 and 10 to the lowered, operative positions (as shown), the side walls 2 are raised, when then allows the nested front and rear walls, 2 and 3, to slide up along grooves 24 into raised positions through cooperation with both side walls 1, as is discussed in further detail in connection with other figures. The above-mentioned kickstand 17 is secured to both sides of the cart base 4 under the control of a handle 18. The structure of the kickstand 17 is designed to recess into the honeycomb wall structure of the cart base 4 so that it adds no further depth to the cart CA when folded, as indicated in dashed lines. The user may operate the kickstand 17 with the foot, or with a combination of the foot and hand. Other figures described below provide some additional detail as to cooperating structures built as part of the turn handle 18, which allow handle 18 to resiliently hold the kickstand 17 in the "down" position.

Two wheels 9 and 10 are connected to the cart base 4 via arm-like structures or support elements 11. The wheel support elements 11 can pivot 270° between a lowered, in use, position shown in FIG. 1, and a nested storage position shown in other figures. The wheels 9 and 10 and the associated support structures 11 can be secured to the cart base wall 4, through a variety of methods described hereinbelow in more detail. One side of the support portion of the wheel support element 11 is indicated in dashed lines at 11*a*, with this support portion 11*a* fitting into matching cavities 12 accessed through the interior wall of the cart base 4 as described below. A cavity or holder 13 extends along the rear wall 3, or base 4, of the cart CA with sufficient space to hold a tightly rolled mesh zippered bag (not shown), as well as a shoulder strap (not shown). In this preferred embodiment, the walls 1, 2, 3, and the cart base 4 are preferably made of a honeycomb plastic, as indicated at 14, but can also be made, for example, of any similar molded material construction which provides durability, but is lightweight.

A carry handle 15 is tapered and molded into the base side wall 4. Additionally, a gap 16 is molded into each side wall 1 so that, when the side walls are folded closed, gap 16 mates with a similar gap through the base structure 4, thereby providing a handlehold to enable carrying of the cart CA when folded closed.

A plurality of support arms 19 serve to retain the handle 5 in its recessed nested position. A side wall lifting/moving handle 20 is provided on each side wall 1. As explained in more detail below, the exterior of each wheel support element 11 has a longitudinal protrusion 21 which interfits with a corresponding recess 22 in each of the side walls 1 allowing the wheel support element 11 to resiliently nest into the side walls 1 when the cart CA is folded closed.

This wheel support elements 11 lock resiliently to the lower cart wall base 4 via two resilient finger like structures (not shown) although a separable insert element is indicated at 25 which houses same and is incorporated into the underside of the wheel support elements 11, which interfit into corresponding sockets (not shown) molded into the cart base 4, as described below. Finger hole openings 26 allow the consumer to release each of the finger-like structures to free the wheel support from the cart base wall 4 at such time as a consumer decides to fold the cart CA for storage.

Figure 3A:
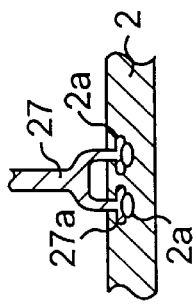
FIGS. 3A to 3F show details and alternative embodiments of parts of the cart of FIG. 3.

Referring to FIG. 3, there is shown a four wheel wagon or cart CB, with numerous attributes discussed elsewhere shared with the two wheeled cart design of FIG. 1. This four wheel wagon/cart embodiment uses a different handle structure than the two wheel cart, although either method may be employed in either embodiment. In the embodiment of FIG. 3 there is no external handle nested around the exterior base of the cart CB and instead there is a center pull handle 27 shown, in solid lines, in the operative position and shown, in dashed lines, nested into the cart base 4. Handle 27 cannot reach the nested position shown unless the front, rear and side walls are folded down. The handle 27 is resiliently maintained in the rested or stored position by a fit with projections (not shown) which are molded into either the inner aspect of the rear cart base wall 3, and/or protrusions or recesses 2*a* and 3*a* molded into the centermost portion of the front and rear folded walls 2 and 3. 2 and 3. Further detail of the arrangement whereby the handle connects to the front cart base wall support structure is shown in FIG. 3A. In FIG. 3A, the cart handle is provided with two protrusions 27*a* which are molded to interfit into grooves 3*a* in the front base wall 3 of the cart CB. This allows the handle 27 to pivot for use or storage as shown in FIG. 3.

Figure 3B:
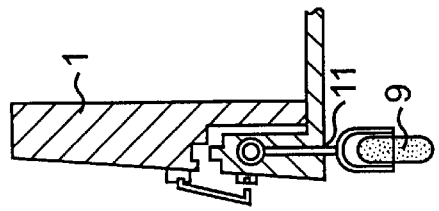
Figure 3C:
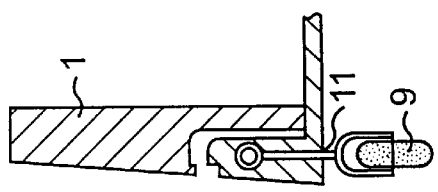
Figure 3E:
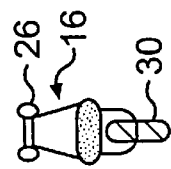
Figure 3D:
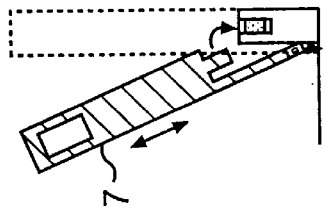

In FIG. 3, the side walls (one of which, denoted 1, shown), front and rear walls 2 and 3, fold down into the base 4 as previously discussed. A swing out door 28, which is formed from a portion of the entire side wall 1, is provided on one or both sides of the cart. Door 28 is hinged to a portion of the side wall, and any one of a number of conventional and well-known latch structures, indicated at 29, can be used to latch door 28. Front and rear walls 2 and 3 have projecting or protruding members 23 at each outer edge which fit into curved side wall slide paths or recesses as shown in dashed lines at 24. In the embodiments shown in FIGS. 3B, 3C and 3D, for front wall 2, the front and rear walls 2 and 3 are thicker along the uppermost portion of the walls than at the lower end of the walls, as shown, so as to provide an interfit into a raised portion 4*a* of the base wall 4. As shown in FIG. 3B wall 2 may include a hinged latch 2L, as shown, preferably made of plastic. Any alternate interfit arrangement with no latch is shown in FIG. 3C. In FIG. 3D another alternative resilient arrangement is used to secure the foldable or collapsible wall 2 to the fixed cart base wall 4, where the wall 2 is pressed down, once raised, to assist in providing the resilient interfit. Alternatively, a split wall and base construction may be employed as discussed below in connection with FIG. 6.

A thin, yet supportive cart base "seat" (not shown) or front or rear wall "pad" (not shown), can be provided which would attach to the base 4 or the walls 1, 2 or 3 with straps which interlace through the preferred honeycomb wall structure and would be secured around the outer facing of such walls or base with velcro or snaps. These pad(s) would add comfort if children are seated in the wagon CB.

As indicated above for FIG. 1, a rolled up mesh bag 13 may be recessed along either a front or rear cavity in the base 4 in any suitable manner.

Figure 3F:
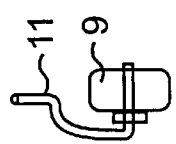
Figure 25:
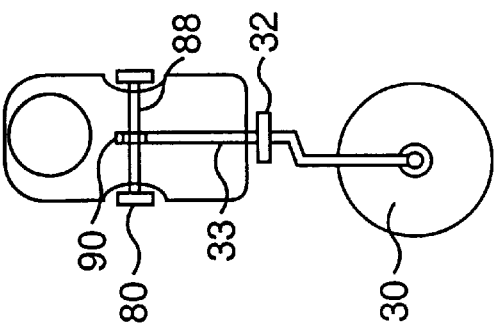
FIGS. 24 and 25 are end and side elevation views, respectively, of a wheel support construction.
Figure 24:
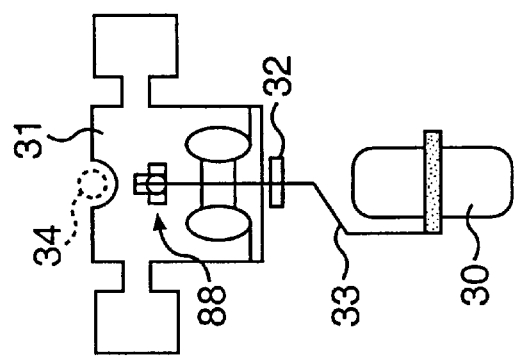

A "rotating" wheel structure support 16 is provided for a rotating wheel 30 which also allows a 270° pivot action that is facilitated through arms 12. Arms 12 are identical to these on the non-rotating wheel support structures of the rearmost wheel 9 described above in connection with FIG. 1. The front two wheels of the four wheel cart CB (one of which is shown at 30) can also be of a caster wheel type shown in FIG. 3E. It will be appreciated that each of the two rear wheels (one shown at 9) can be supported by structures surrounding the wheel 30 on both sides, i.e., a two-sided construction, or can be supported by a single sided arm support as shown in FIG. 3F. Again, rotating wheel 30 may rotate 360 degrees by virtue of a metal arm 33 which extends longitudinally up into a wheel arm support 31 mounted in base 4. A washer 32 is resiliently held at the bottom of the wheel support, 31, by a crimped or widened portion 33*a* below the washer 32, and the upper part of the metal arm 33 extends through the center of the wheel arm support 31 to a grooved out and recessed area at the top of the wheel arm support 31 where support 31 is secured by an end cap or bolt 34. It is noted that an alternative securing arrangement is shown in FIGS. 24 and 25 described below.

Figure 30:
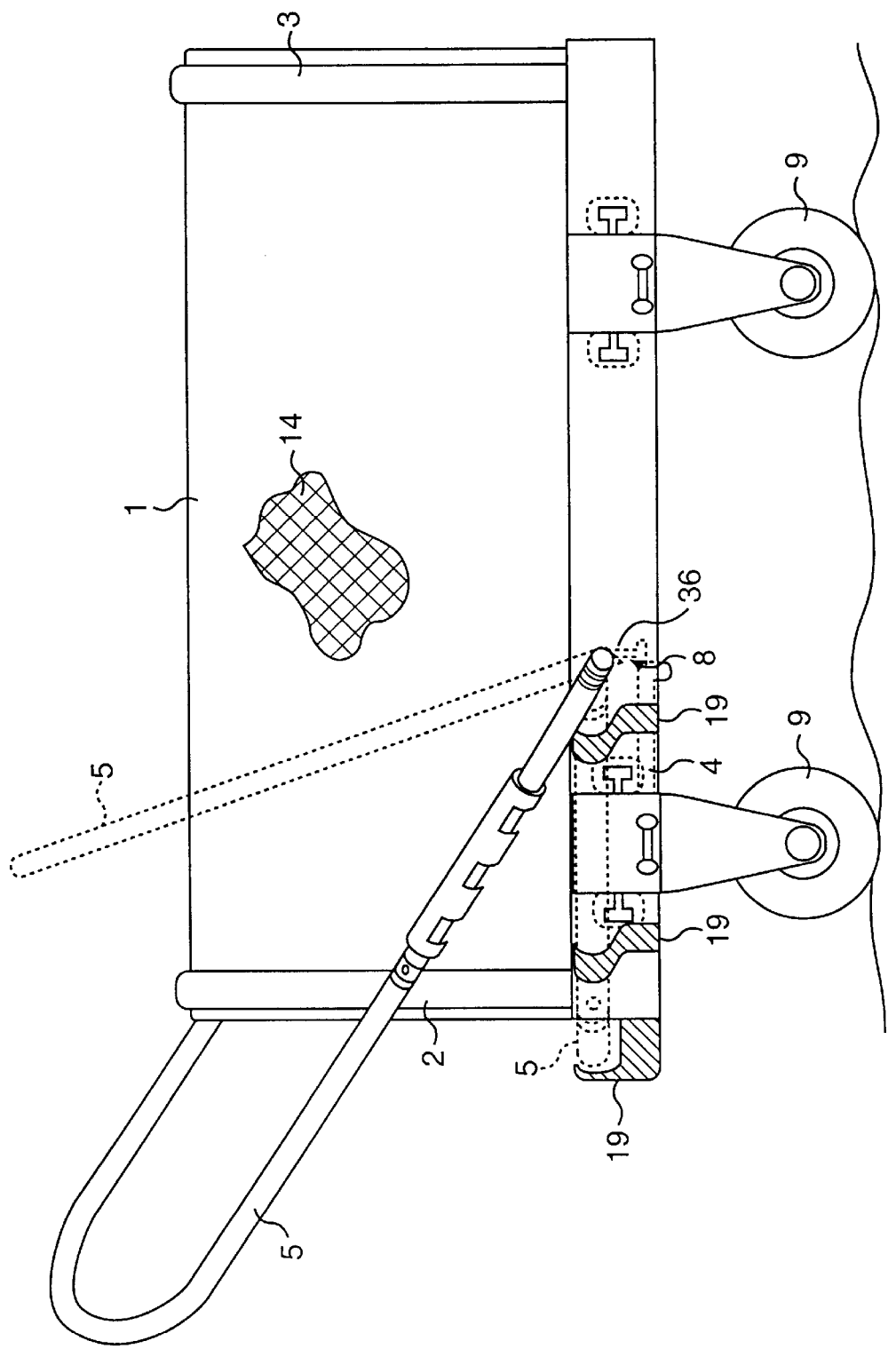
FIG. 30 is a side elevation view, partially broken away, of a further four wheel cart embodiment.

The construction of FIG. 3 does not prevent the consumer from utilizing the finger holes or recesses, shown at 26, which allow release of the wheel structure 16 from the cart base 4. Arms 12, in cooperation with cavities shown in dashed lines, hold the entire wheel structure 16 in the cart base side wall 4*a*, while for wheels 9 portion, a central retention insert box portion 25, of the wheel arm structure 11 on the underside, includes two finger-like projections 25*a*, which resiliently interfit into matching areas in the cart base 4. An alternative embodiment of the four wheel cart is shown in FIG. 30 described below.

Figure 4:
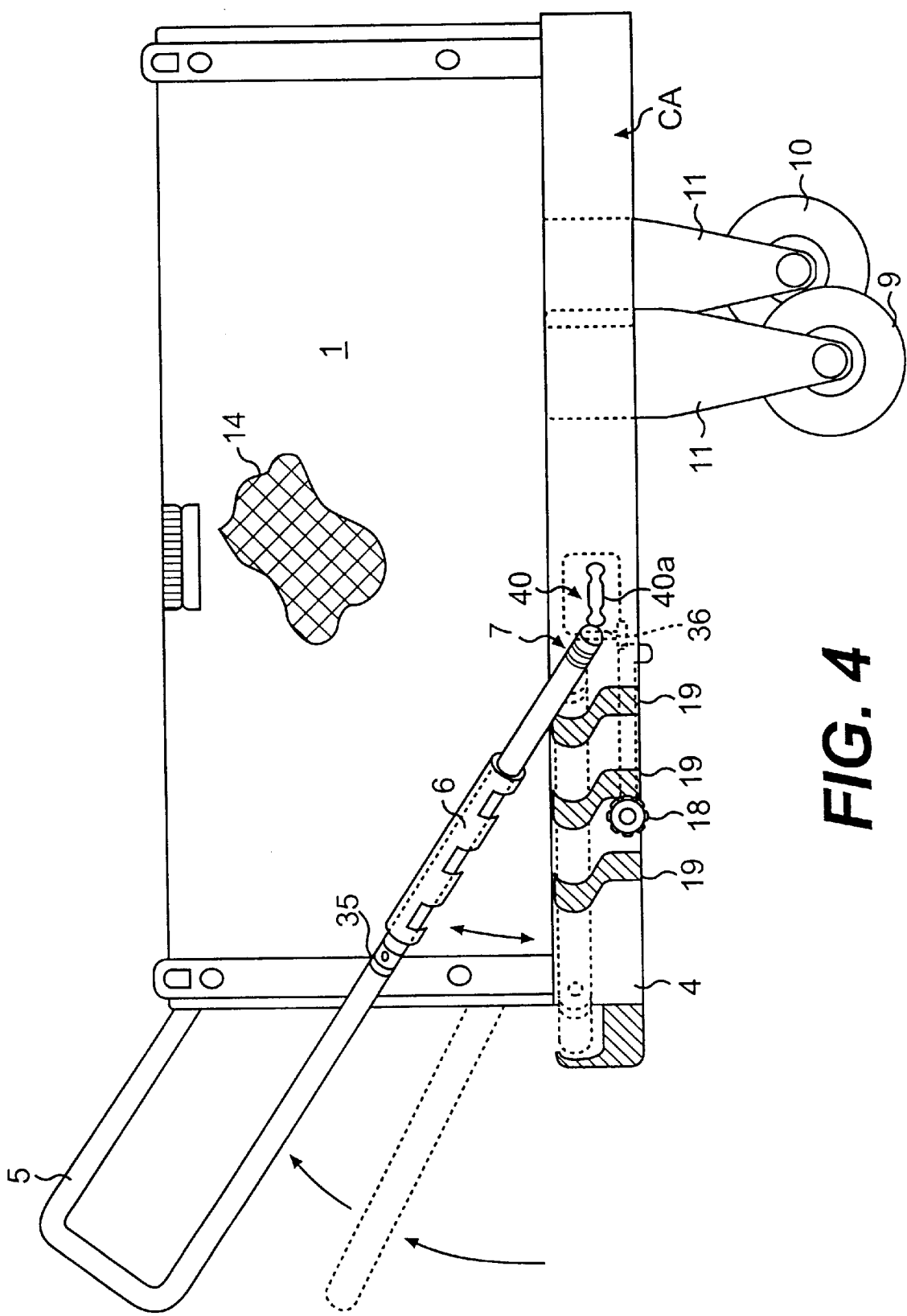
FIG. 4 is a side elevational view, partially broken away and partially in section, of a further preferred embodiment of the cart of the invention.
Figure 4B:
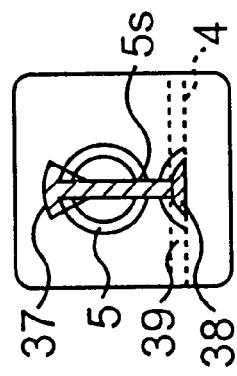
FIGS. 4A, 4B and 4C show details of the cart of FIG. 4.

Referring to FIG. 4, further details of the telescoping U-shaped handle structure 5 of FIG. 1 are shown, particularly with respect to the manner of securement of same to the two wheel cart base 4. With handle 5 in the fully raised, fully telescoped out position shown in solid lines in FIG. 4 handle 5 is secured in side wall sleeve 6, which includes a spring maintained detent button 35. Detent button 35 is shown in more detail in FIG. 4A, which shows the detent button 35 and associated spring 35a as well as the innermost portion of the telescoping handles portions 5, and the outermost handle portion 5A. It will, of course, be understood that the portion of the telescoping handle which is the outermost sleeve may be reversed from that shown in FIG. 5A. The detent button 35 may either simply recess or retract in response to forceful contact, or, alternatively, may require the user to press firmly down on button 35 or even turn a hand dial (not shown) in order to inwardly telescope the handle structure 5. Also shown in FIG. 4 are the kickstand turn handle 18 described above as well as the cart handle support arms 19.

Figure 4A:
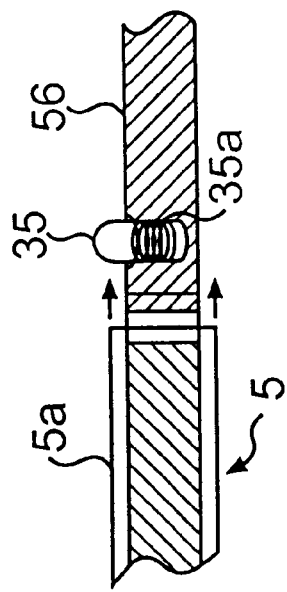

FIG. 4A also shows the end pin member 37 of the tubular handle 5 where the handles are secured through an opening to the cart base 4 or to side wall 1. A screw hole 55 extends completely through the handle 5 and pin 37 extends through the cart base wall 4 where a head 38 on the pin 37 screws or fits onto the pin. Alternatively, the pin structure may interfit through the cart base 4, through the handle 5 and then resiliently snap and hold the handle 5 through the holes just described. The pin 37 and associated head 38 may be designed to further interfit into a recessed, grooved out portion of base wall 4 indicated at 39 to fix the pin 37 or to otherwise retain the pin 37 in an immobile position.

Figure 4C:
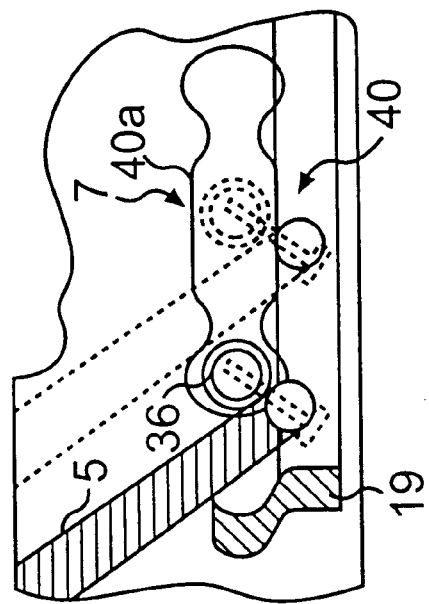

Referring again to FIG. 4, an alternative embodiment is shown wherein a slide path 40a is provided by slide element 40 (depending upon the size of the cart and nature of the handle 5. This slide path is shown in more detail in FIG. 4C. The pin structure 36 which travels through holes in the end of handle 5 are secured into the slide path defined by element 40. In FIG. 4C, handle 5 is shown as being affixed or secured in the slide 40 and, in dashed lines, shown as moving along the slide path with the pin structure 36 moving in the path. As illustrated, both ends of the slide path 40a are configured, i.e., are narrowed or necked down, so as to resiliently hold the handle 5 in the desired position.

Figure 5:
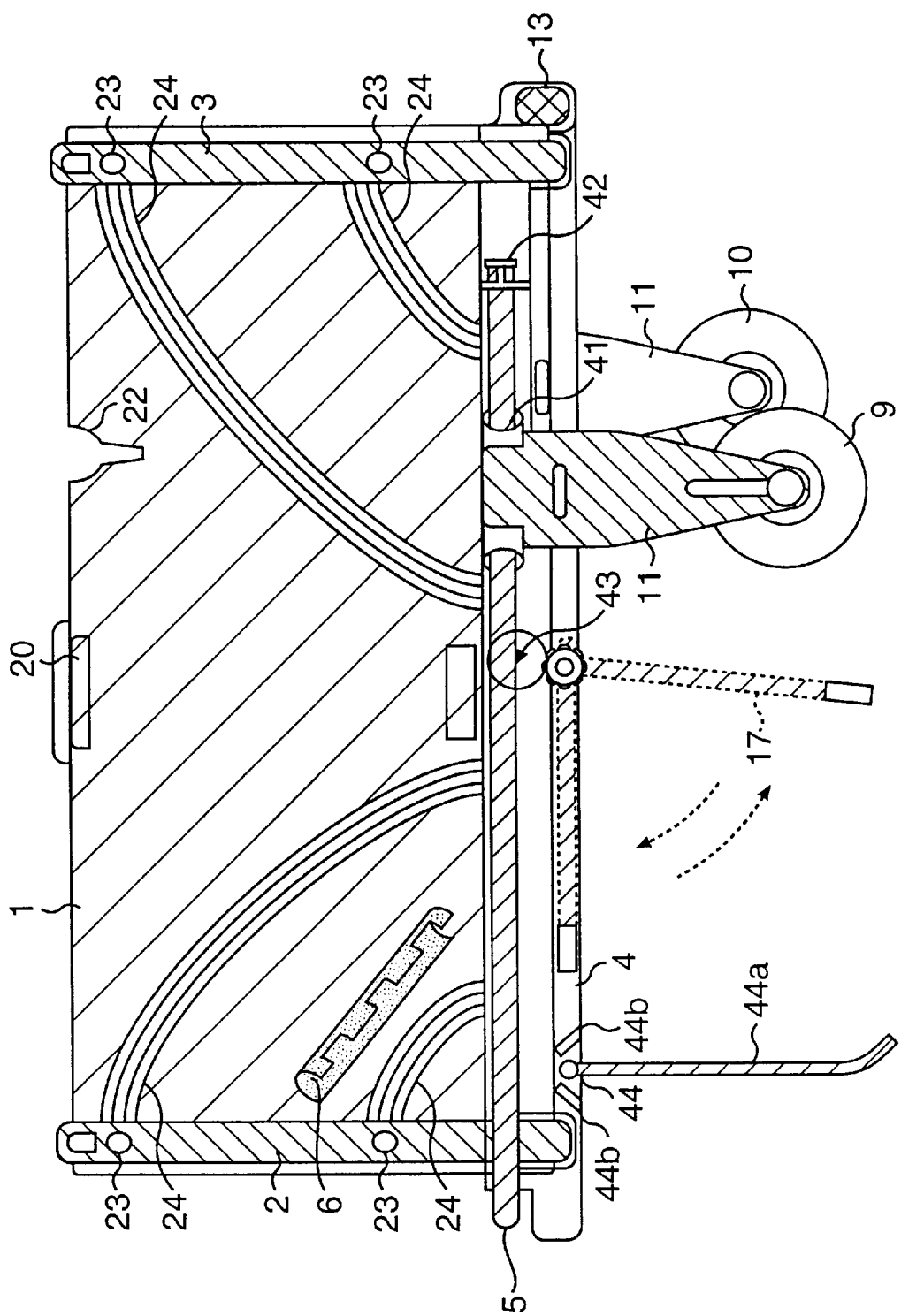
FIG. 5 is a side elevational view, partially in section, of a further embodiment of the invention.

Referring to FIG. 5, there is shown an alternative embodiment of the two wheel cart of FIG. 1, which utilizes a different securing arrangement for the cart handle 5 to the base. In this embodiment, the handle 5 is not telescoping, but rather travels into a recessed position completely through the hollow circular structure 4 of a wheel arm support 11, by using spring maintained detents 42 at the end of the handle 5. At a point indicated by the circle at 43, the handle 5 travels along a slide path to a termination point, where the handle 5 is then raised. Not shown is a slide path sleeve which would travel along the entire cart base wall, on both sides of the wheel arm support 11. This sleeve is partly open at the top to allow the handle 5 to be raised for use.

An opening 44 is molded in the cart base wall 4 to allow a suitable flexible cord 44a (such as a "Bungie" cord) to be tied-off and secured to the cart base wall 4. A series of open grooves 44b are provided to resiliently secure the cord 44a in place when the latter is stretched from the opposing side. It will be appreciated that a multiplicity of such areas may be molded into the cart base 4.

Figure 6:
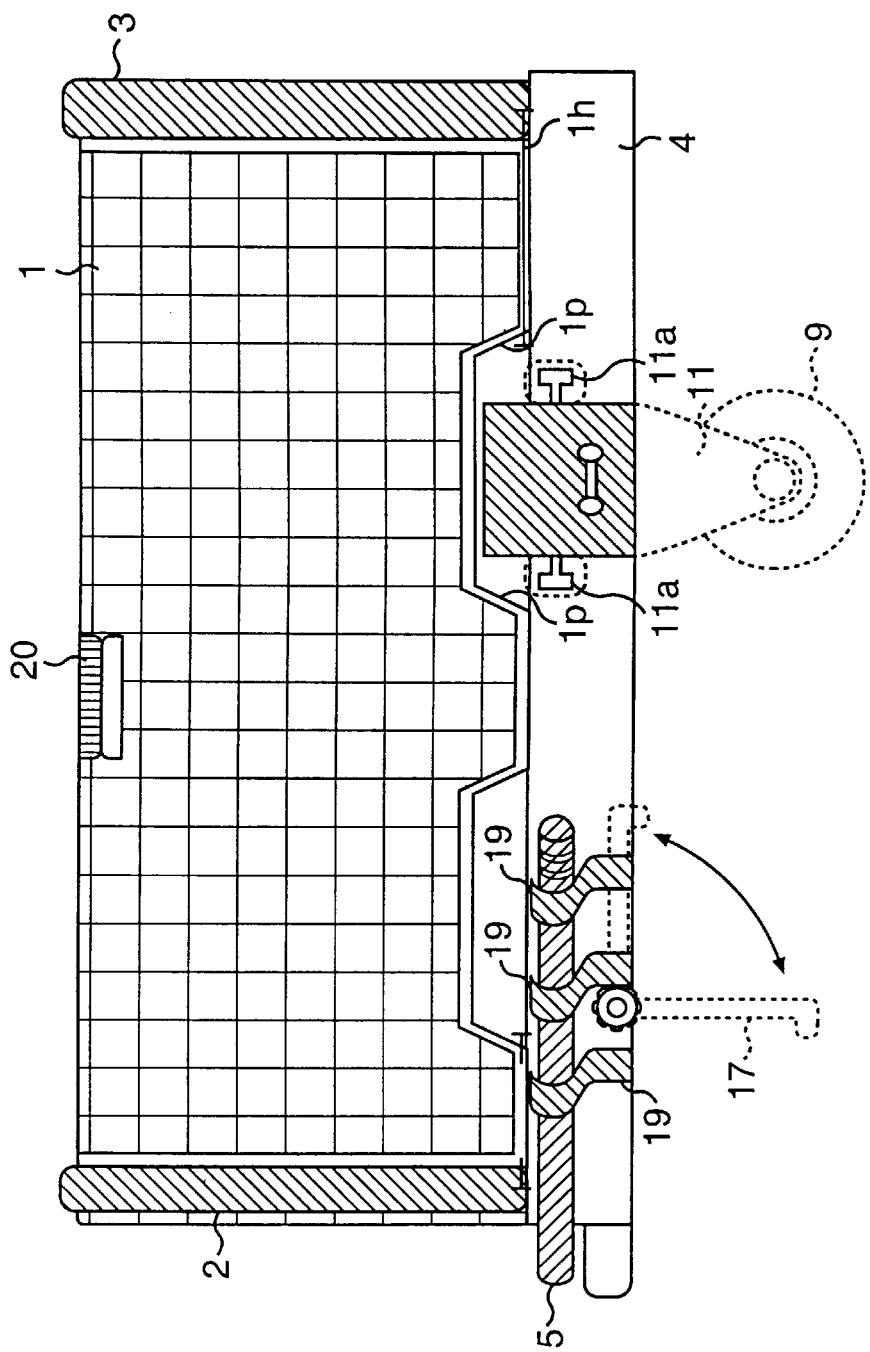
FIG. 6 is a side elevational view, partially in section, of yet another embodiment of the invention.

Referring to FIG. 6, there is shown another alternative wheel cart side wall embodiment. In this embodiment, the side wall is constructed of a honeycomb molded material and hinged to cart base 4 by a series of hinges, one of which is shown at 1h. The hinged structure 1h may include male protrusions molded into side wall 1 which resiliently fit into corresponding female recesses in the cart base 4 (not shown in FIG. 6), rather than an actual hinge traveling through the lower most edge of the side wall 1. Further, as shown at 44, the side wall 1 is molded so when raised it provides a flush single side wall profile 1p immediately above the wheel arm structure 11, as well as with other portions of the base wall 4. When side wall 1 is raised, the lower edge may also interfit resiliently with the uppermost facing edge of the base wall 4, in one of several alternative embodiments, as described below in connection with other figures.

Figure 7A:
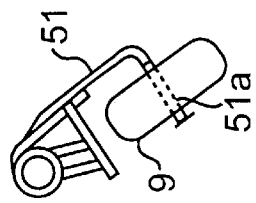
FIG. 7A is an alternative embodiment of the wheel support arm.
Figure 7:
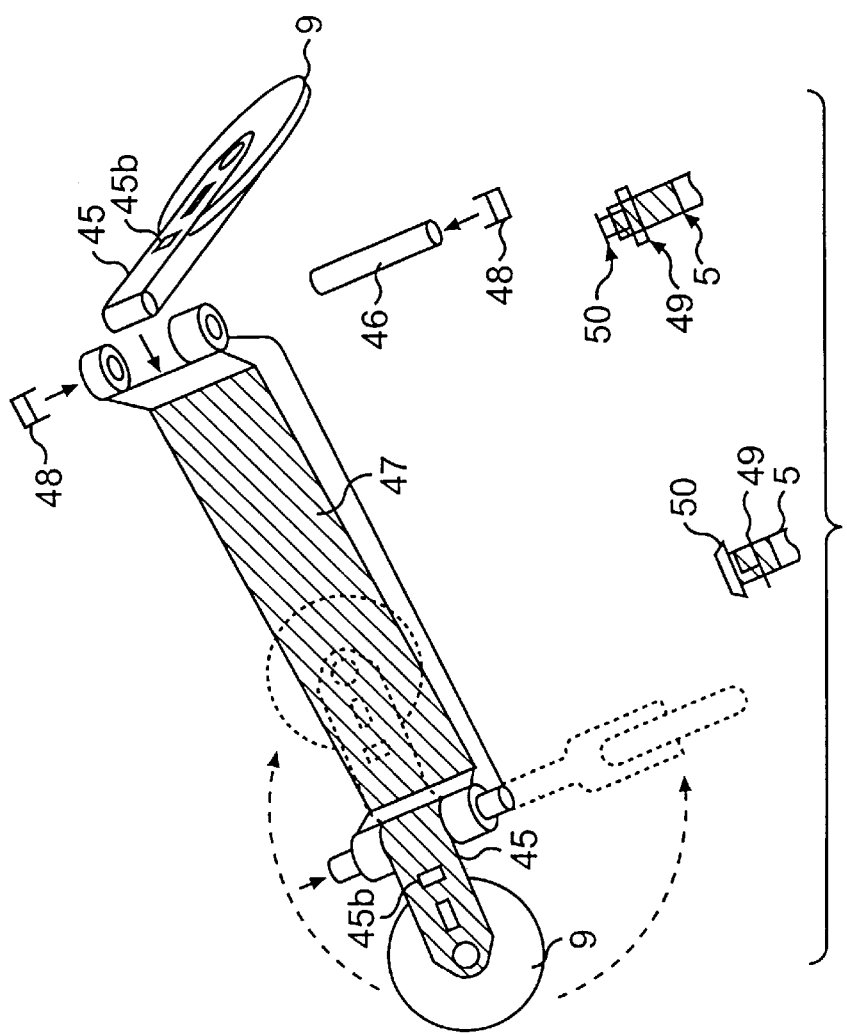
FIG. 7 is an exploded perspective view of a wheel support structure in accordance with a preferred embodiment.

Referring to FIG. 7, there is shown, in an exploded perspective view, an embodiment which provides an especially durable cart base and wheel arm support structure, formed from a series of separate wheel arm and housing parts, in contrast to the more unitary molded wheel support element 11 and an associated housing construction disclosed in the figures discussed above. Alternatively in other figures. A non-unitary wheel support 45 and associated fixed wheel 9 shown adjacent to a base and wheel structure shows the support member 47. A support sleeve 46a, which fits through spaced cylindrical holes or openings 47a formed by bracket arms 47b. Wheel support element 45 includes an upper cylindrical portion 45a which fits between bracket arms 47a so that the opening in cylindrical portion 45a aligns with openings 47a. Cylinder fits through the openings 47a in bracket arms 47b, and the hollow cylindrical portion 45a of wheel support 45. Hollow end caps 48 fit over cylindrical and help secure the wheel structure in place. Alternatively, end caps 48 may be elongated and have enlarged end structures which interfit into corresponding cavities molded within the cart base walls as disclosed below in connection with other figures.

When the wheel structure 45 is in place, and is folded down into the operable position, a "retention" element or recess 45b interfits resiliently with a corresponding projecting base and wheel support structure element 47c. Of course, the two may be reversed wherein a female recess (not shown) is provided at 47 and a male element (not shown) is provided at 45b. FIG. 7 shows, on the other side of the base support 47, the entire wheel support structure 45 and associated wheel 9 in a first, lowered position in dashed lines, and a further, stored position, also in dashed lines, wherein the wheel is disposed in its storage position atop base and wheel support member 47. Essentially, the wheel pivots 270° between its operative and storage portions.

For purposes of further illustration in FIG. 7, the two sides of the U-shaped handle 5 are shown and 7, and, as illustrated, detent is provided at 49 which is held on through an end cap 50. This allows the entire handle structure 5 to travel through the hollow sections of cylinder 46, opening 45a, openings 47a and openings (not shown) in end caps 48. In the latter regard, end caps 48 have a hollowed out central section or opening to allow for interior passage of the cart handle 5. Referring to FIG. 7A, an alternative wheel support 51, is shown for wheel 9 wherein the lowermost axle portion 51a passes through only one side of the central rim or hub of the wheel 9.

FIG. 8 illustrates, in a schematic manner, the wheel and support structure 11 (both (1) in the stored position, as shown to the left, and (2) in the pivoting position, as shown to the right, with the folded down side walls 2 being indicated in dashed lines.

Referring to FIGS. 9A and 9B, an alternative embodiment of the wheel support structures is shown. The embodiment is a 90° wheel support structure rather than a 270° pivoting structure as described above. The wheel 9 is mounted to the underside edge of the cart base 4 with a hinged member 52 and an associated hinged or articulating arm 53 with a central hinge. The wheel structure may be folded up under the cart (as shown in FIG. 9B), with the wheel 9 folded under the base 4 and hinge of arm 53 folded up as illustrated in FIG. 9B. Thus, although the 270° pivoting embodiment is preferred, an alternative embodiment of the cart or wagon of the invention could include some or all other elements of the cart/wagon disclosed herein, but use the type 90° folding wheel rather than the pivoting wheel structure disclosed elsewhere. Hinge 53 can incorporate a suitable "locking" hinge, which releases via forceful pressure or via pressure on a release button (not shown).

Figure 10:
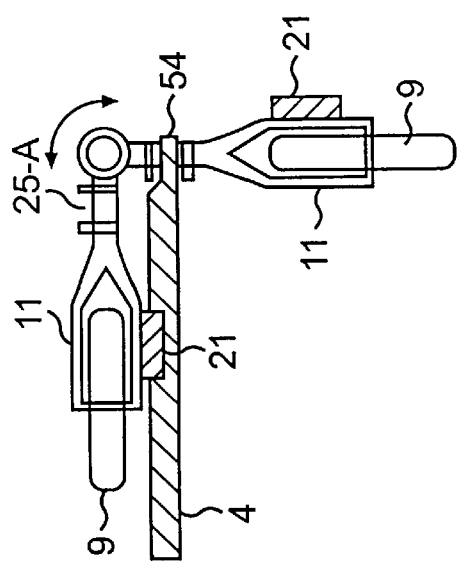
FIG. 10 is an end elevation, partially in section, showing folding of a wheel.

FIG. 10 shows further detail of the wheel construction described with male and female retention arrangements to allow for support or stabilization of the construction in its operable, folded down position. The wheel 9 and support structure 11 are shown nested atop the cart base 4 (side and front walls are omitted for purposes of clarity view), and the same wheel 9 and support structure 11 in the lowered, operable position. Longitudinal protrusions 21 are provided along the exterior of the wheel structure 11 which are designed to loosely, yet resiliently interfit with corresponding grooves (not shown) molded into the side wall when nested (side wall not shown). The wheel 9 pivots 270° as shown and cooperating male finger-like protrusions, 25A, on the wheel support 11 are designed to resiliently hold the wheel support structure in the lowered, operable position, via an interfit with grooves or other receptors 54 the cart base wall wheel structure receiving area of base 4.

Figure 11:
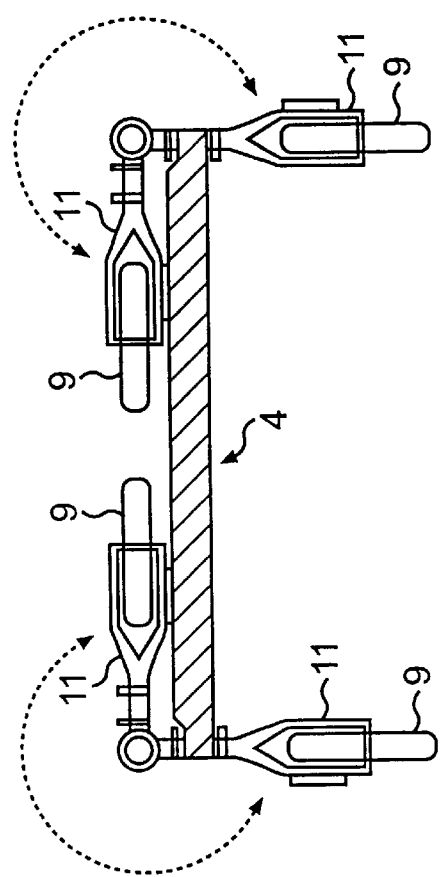
FIG. 11 is an end elevation, partially in section, showing folding of two wheels.

FIG. 11 simply shows both wheel wheels 9 and associated structures 11 nested above the cart base 4 and in the operable positions thereof. As indicated above, the cart walls (not shown) must be folded down to allow the pivoting wheel structures 11 to nest.

Referring to FIG. 12, an embodiment is shown wherein the cart base and wheel structure support 47 is made of single or multiple cross members or "joists" 55, constructed of a suitable metal or plastic. Cross members 55 interfit with one or more corresponding grooves 56, thereby providing resiliently interfitting with the members 55. Members 55 are molded through a passthrough slot in the bottom of the cart base 4 as indicated in FIG. 12 or, alternatively, as shown in FIG. 12A, comprise members which, resiliently snap in from under the base 4 and resiliently interfit into grooves that correspond with the base support 47. In this embodiments, ridges or protrusions 56 are molded into the underside of the cart base 4. FIG. 12A shows a side view of such a resilient base and wheel support 47 fit with the cart base 4 where underside support 47 snaps under the base 4, and detachable supports 56 each extend upwardly from each end of the base 4, to form a support structure for the wheels 9 and 10. The cylindrical support members 56 may thus either be manufactured as a unitary structure with the support base and wheel structure 47, or may be resiliently interfitted onto the base support member 47, depending upon desired strength for the base of the structure and for the wheels themselves. The wheel support arms 57 are constructed in a "U" shape, rather than cylindrical manner, allowing a unitary wheel support structure to mount thereon, and be retained into cart base wall cavities described below which are designed to hold the wheel support arm and allow the same to pivot 270°.

FIG. 13 shows one arrangement for providing the retention of the pivoting wheel support structure 11. FIG. 13 shows a portion of the exterior side of the base wall 4 as will the exterior lower portion of the upright side wall 1 and part of the wheel support 11. Base wall cavities 12 are shown which support the cylindrical ends of one arm of the unitary wheel support structure arms 11A. These ends are each held in the corresponding cavity 12 which is molded into the base wall 4, but accessed through the interior side of the base wall as disclosed in other figures. The uppermost portions 57 of the optional "U" shaped arms of the wheel structure support members 11, which support arms 11A and may be unitarily constructed as a part of the cart base wall 4, as a stand-alone structure which resiliently attaches to a separate cart base support 47 (shown in FIG. 12), or as a structure which is constructed as part of a separable base support member. User finger holes 26 allow detachment of the wheel structure 11 from the cart base side wall 4 in order to release and nest the wheel structure 11 and associated wheels 9 as described in more detail below. Any suitable alternative quick connect or resilient "button release" arrangement may be employed (e.g. in central retention section 25) to provide quick release and/or for automatic resilient interfit of the wheel structure to the cart base.

Figure 14:
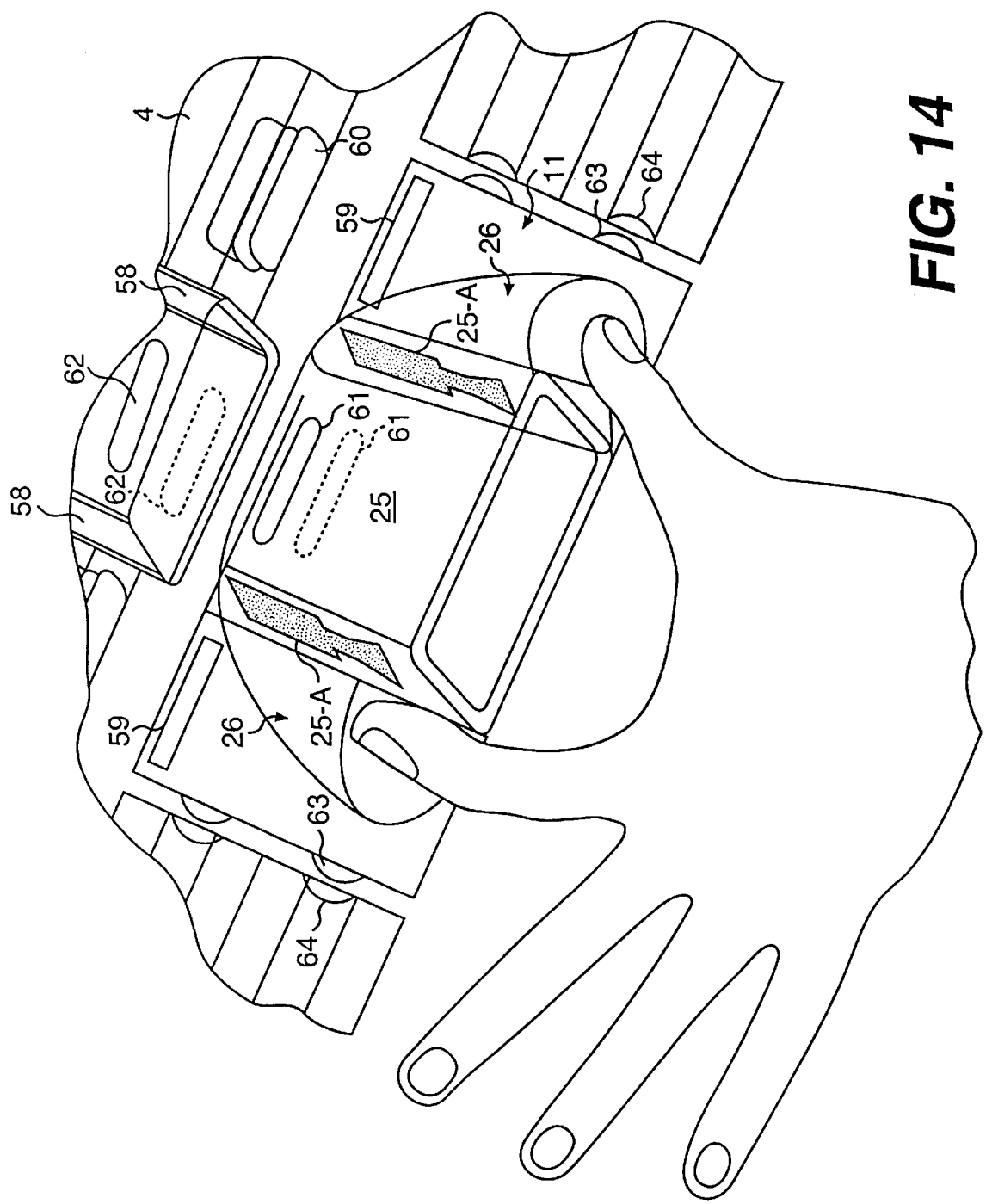
FIG. 14 is a perspective view of the wheel support structure, showing a step in the disconnection thereof from the cart.

FIG. 14 shows a preferred arrangement whereby the wheel support structure 11 resiliently interfits into the cart base 4. In this arrangement, the user places the fingers into recesses 26 on each side of central retention section 25, and presses inward on resiliently movable finger-like elements or structures 25A which, as shown in FIG. 14, are then freed from slots 58 which are molded as a part of the overall cart base, 4. The finger-like structures 25A are constructed with outwardly facing clip like portions, which extend or "secure" past the corresponding openings 58 in cart base 4. Once the structures 25A are freed from cart base 4 by being squeezed inward, the wheel support structure 11 can be pivoted 270° to ultimately nest the associated wheel 9. Further multiple retention means can also be employed. Secondary male attachment elements 59 are molded into the wheel support structure 11 closest to the cart base 4 on either side of the central retention section 25, and these affix or attach to secondary female cart base attachment recesses or grooves 60 which interfit resiliently element 59, but this attachment can be readily overcome when the user detaches the central section 25 and its finger-like projections 25A by a finger squeeze on the latter and pulls forcefully on the wheel structure 11 in a direction away from the cart base 4. Of course, any of male and female connectors can be reversed. In addition, male connector elements or protrusions 61 are incorporated in the inwardly attaching central insert section 25, which mate with female connector elements or recesses 62 formed in molded portions of base 4. In addition a series of matching female recesses 64 are also molded into the side walls of the cart base 4 to interfit with male protrusions 63 on each side of the wheel support structure 11. In general, the retention for wheel support structure is chosen to provide firm holding but should be releasable when finger-like control elements are depressed and released.

FIGS. 15A, 15B, 15C and 15D shown in more detail the central wheel structure retention section 25 described above in connection with FIG. 14. In FIG. 15A, a view is provided from the outwardly facing external side of the wheel support 11, and the central retention member 25 is shown as resiliently interfit into the wheel support, with the recesses for finger access shown again at 26. FIG. 15B shows the central support member 25 as including a perimeter exterior lip 65 which provides a resilient interfit with an opening (not shown) on the wheel support structure 11. The finger-like members 25A are shown in FIG. 15B as well as FIG. 15D which shows a side view of one preferred finger configuration. In FIG. 15B, further male resilient attachment elements, shown in dashed lines at 61, are adapted to mate with recesses 62, shown in FIG. 15C which are molded into the cart base wall 4. FIG. 15C also shows the open receiving areas 58 molded into the cart base wall 4, which, as described above capture and return the finger-like structures 25A shown in FIG. 15B. FIG. 15C also shows another view of the adjacent secondary retention recess 60 in the cart base side wall 4, which, as described above, is adapted to receive a secondary male retention element 59 of the wheel support structure 11 (not shown in FIG. 15C).

Figure 16:
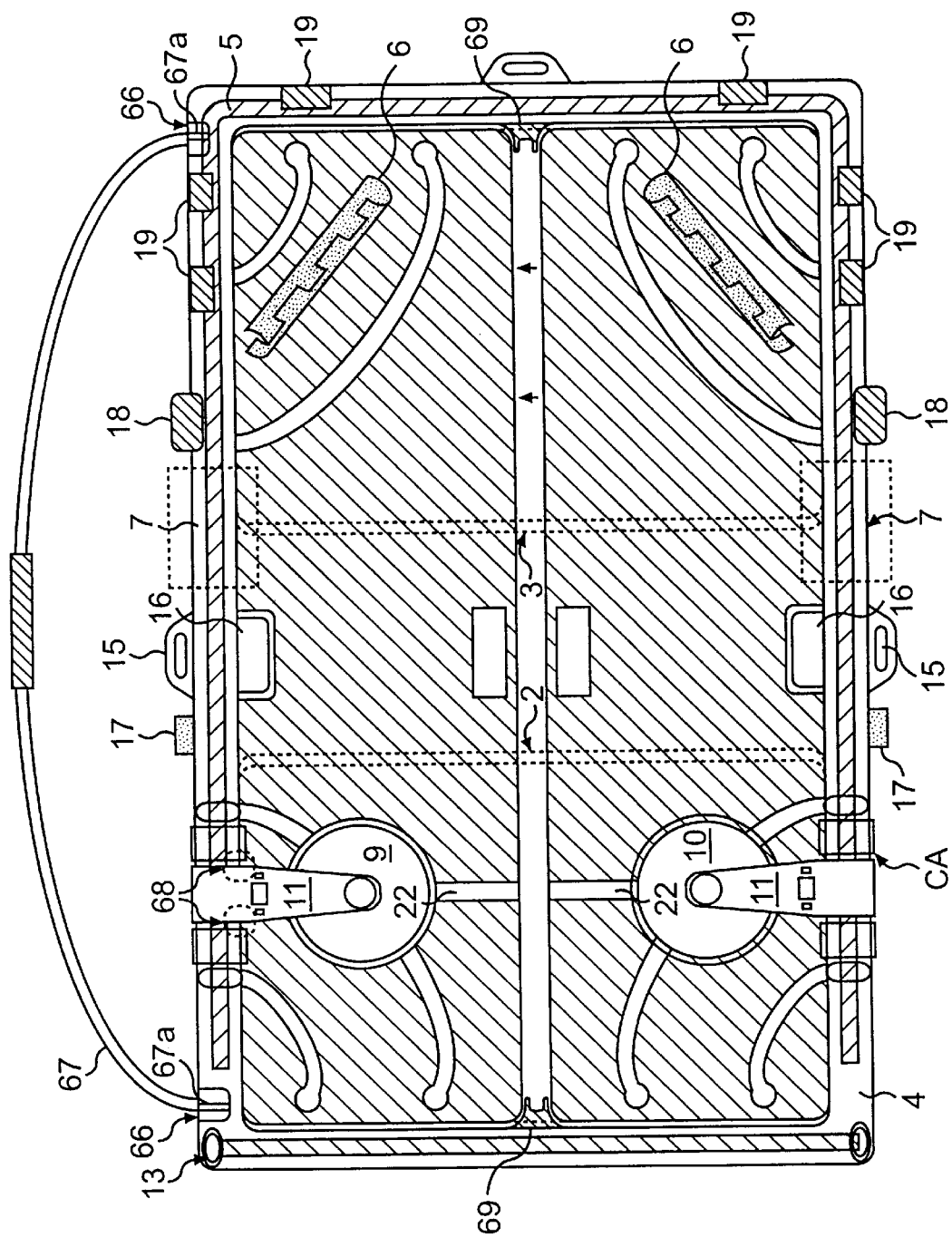
FIG. 16 is a top plan view of a further embodiment of the two-wheeled cart.

FIG. 16 is a top plan view of the two wheel cart "CA" with all parts completely folded and nested. In this view, the side walls 1 lie atop the rear and front walls 2 and 3 which are shown in dashed lines, with the base 5 therebeneath and the generally "U" shaped handle 5 nested shown. While this U-shape for handle 5 is preferred, two straight handles (not shown) may be employed which would extend along the sides of both side walls 1, although, among other advantages the "U" shaped handle 5 provides more inherent support to the side walls 1 when the latter are raised. Recessed cavities 66 are molded into the cart base wall 4 to receive any suitable arrangement for mounting a shoulder strap 67. Strap 67 includes suitable hooks 67a which are retained at 66 so as to enable carrying of the device when nested and closed. The cavity 13 for holding the plastic or mesh bag described above, is located at one end of the cart CA, and can be used when the cart CA is nested and fully closed. The cavity may zip or use velcro, for example. The two wheels 9 and 10 are shown in their nested, stored position, and as described above these wheels may be retained in this nested position by one or more ore means. For example, as described in connection with FIG. 1, wheels 9 and 10 can be resiliently held in corresponding side wall grooves 22 which interfit with corresponding protrusions 21 (see FIG. 1) molded as part of the exterior wall of the wheel structure, or alternatively, or in addition, the upper section of the inner cart base wall can be provided with a ledge, indicated schematically at 68, which resiliently interfits with a corresponding male/female protrusion, recess or groove (not shown) molded as a part of either wheel support structure 11.

As indicated above, an opening, 16, may be molded all the way through side walls 1 as well as the cart base 4 itself to present a handhold for the user to lift the closed, folded cart from either side. In addition, exterior molded handles 15 may be made as part of the exterior side wall of the base 4.

FIG. 16 also shows the kickstand handle structure 18, and a plurality of support arms 19 for the cart handle 5.

Molded elements 69 on the inner base walls 4 are used to resiliently hold each of the side walls 1 when they are folded and nested as discussed above. Sleeves 6 are molded as a part of the side walls 1 and receive the handle 5 when the latter is raised up. In this embodiment, the handle 5 is shown extending through the cylindrical wheel support 11 as described above. In the alternative embodiment described above, a telescoping handle 5 such as shown in FIG. 1, can be secured to the base wall 4.

Figure 17A:
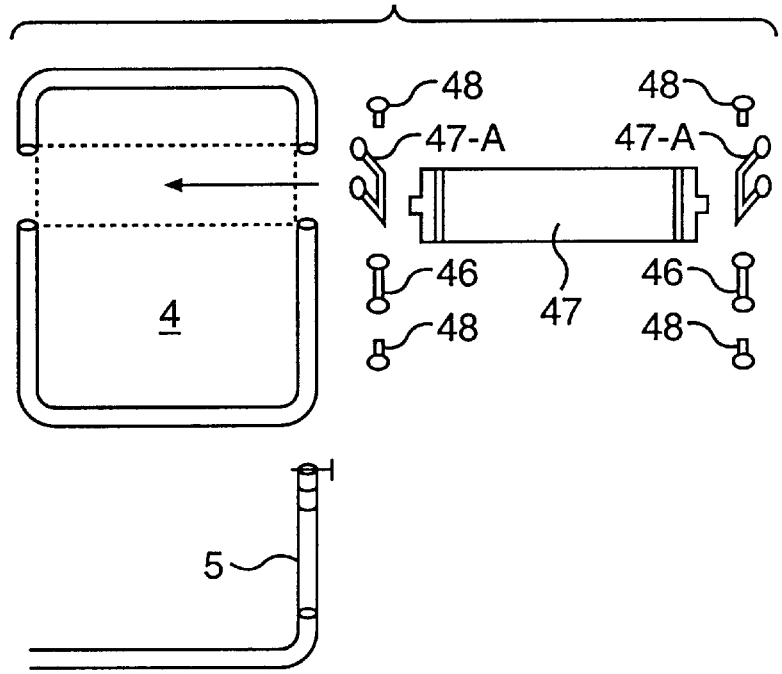
FIGS. 17A, 17B, 17C, 17D, 17E, 17F and 17G show components of a further embodiment of the invention.
Figure 17B:
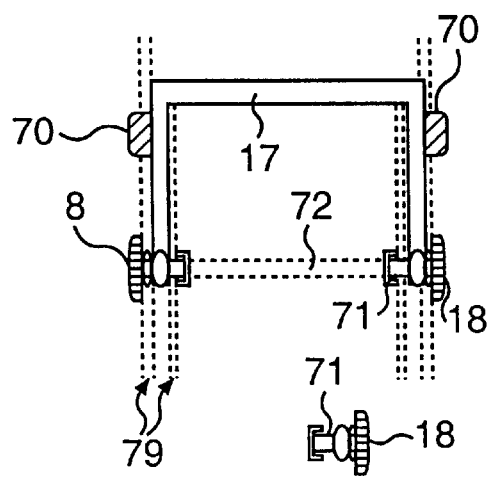
Figure 17C:
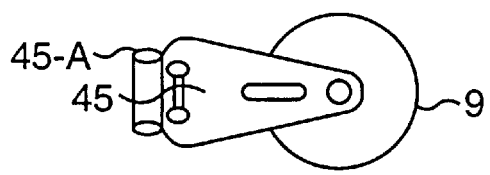

FIG. 17A shows separated parts of the two wheel cart CA and includes a top plan view of the base 4, as well as the wheel structure support parts described above in connection with FIG. 7. It is noted that most of these of which are optional since many of these structures may be instead molded into a unitary wheel structure 11 as indicated in FIG. 17C. FIG. 17B shows details of the "kick stand" unit 17 which was generally described above and which can be constructed of metal, extruded aluminum or suitable plastic and includes outwardly protruding kickstand elements 60 which clear the exterior perimeter of the cart base wall 4 to serve as the kickstand. Two detachable turn handles 18 are employed which interfit into each of two handle arms 71 through holes (not shown) in the exterior walls of the cart base 4. As indicated in dashed lines each end of the kickstand arm structures can alternatively be connected by a connection element 72 extending under the cart base 4, and the turn handles 71 may extend through another hole through corresponding underside cross members 79, also shown in dashed lines, on either end of the base underside, thereby securing the kickstand 17 and the turn handles 18 by resilient fit between the end of a turn handle arm 71 and corresponding cross member 79.

Figure 17D:
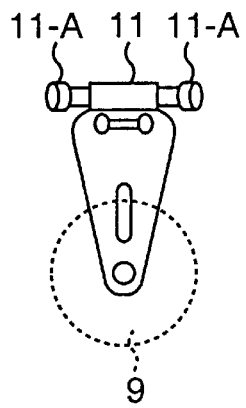

FIGS. 17C and 17D show two alternative wheel structures, wherein structure 45 of FIG. 17C requires a separate cylindrical sleeve (not shown), and wherein structure 11 of FIG. 17D is a more unitary wheel support structure incorporating arms 11A which interfit in matching cavities (not shown) in the cart base wall.

Figure 17E:
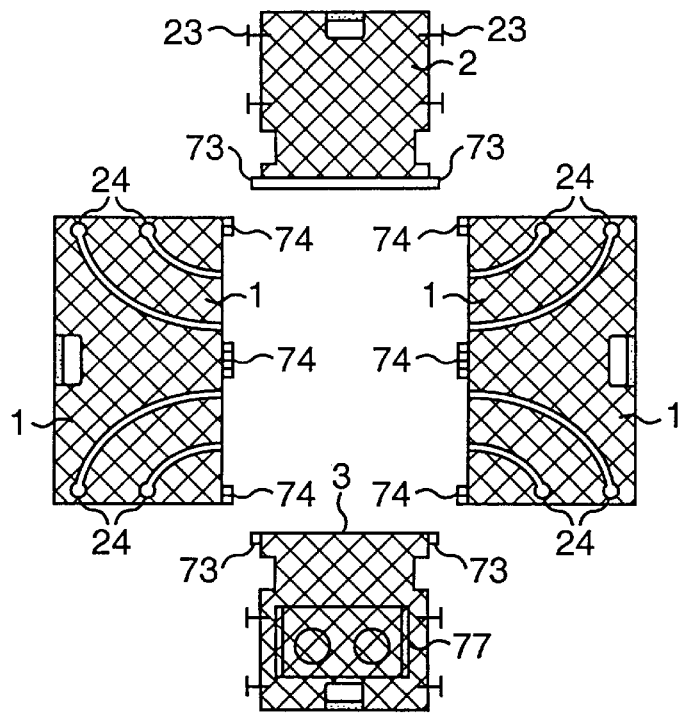
Figure 17F:
Figure 17G:
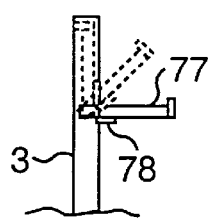

FIG. 17E shows some details of the side walls 1, rear wall 2, front wall 3, particularly as to how the various walls actually interfit. Integrated hinges 74 are built into the base of the side walls 1 which are designed to interfit with portions of the base wall 4 itself, or with lowest edge of the interior side of the base wall 4. When front and rear walls 2 and 3 are completely lowered, the protruding members 23 that fit into the side walls are released somewhat from the bottom of each of the side walls 1 because the side walls 1 are tiered slightly higher on the base 4 than the front and rear walls 2 and 3. the front and rear walls 2 and 3, which are supported at a slightly lower tier on the cart base 4 are hinged by hinges 73 on each end to the cart base 4. FIG. 1F shows one alternative interfit design between the front and rear walls 2 and 3, protrusions 23, and the side wall slide paths 24 wherein protrusions 23 and slide path 24 are replaced by alternative shaped protrusions 75 molded to the end walls 2 and 3 and alternative matching protrusions and recesses 76 are molded in side walls 1. As shown in FIG. 17E the rear wall 3 (or the front or side walls) may include a drop-down hinged member 77, shown further in FIG. 17G, which serves as a tray to hold implements, or to hold beverage containers. a "stop" 78 is molded into the wall or drop down portion.

Figure 18:
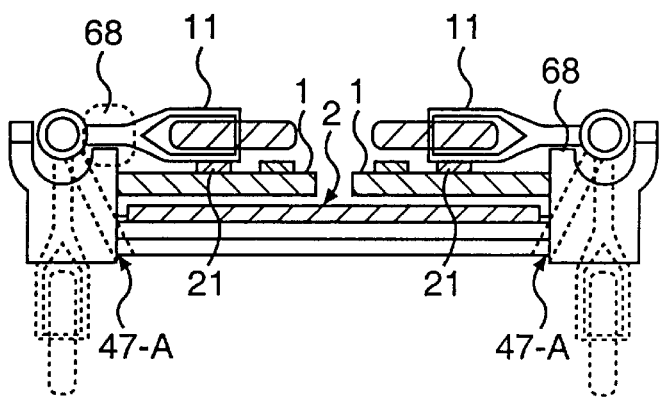
FIG. 18 is an end elevation view, partially in cross section, showing the folded wheels.
Figure 19:
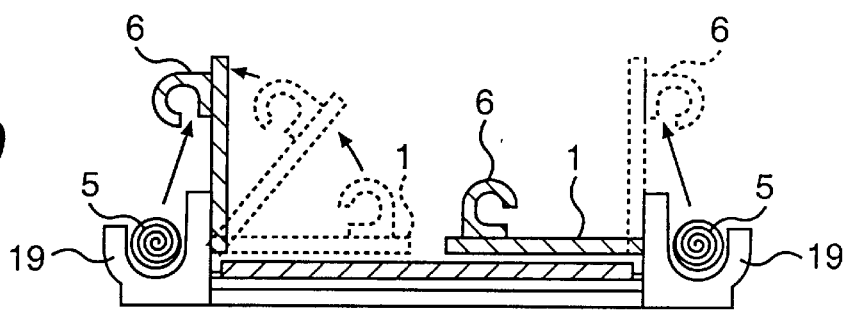
FIG. 19 is an end elevation view, partially in cross section, showing details of the side wall construction.
Figure 20B:
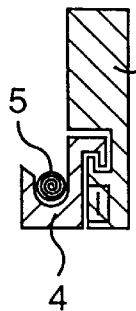
FIGS. 20A and 20B show details of the end walls.
Figures 20, 20A:
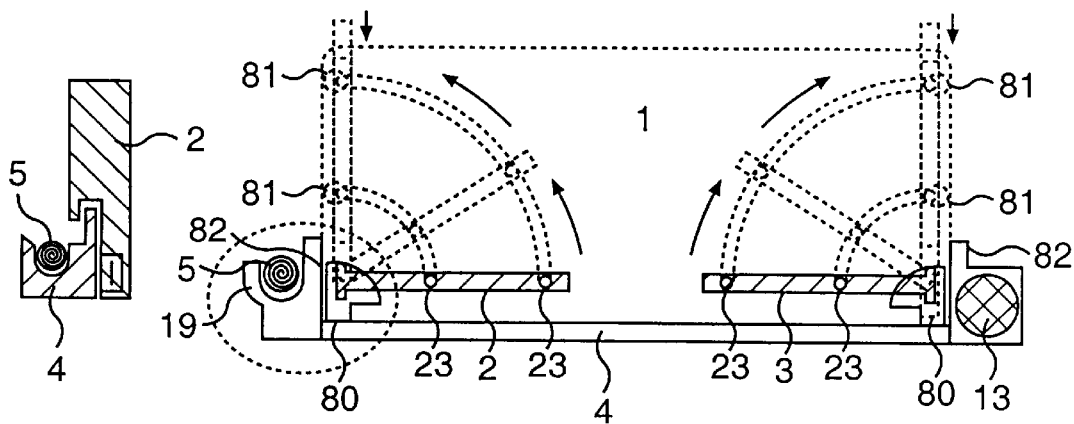
FIG. 20 is a fragmentary side elevational view showing folding of the end walls.

FIGS. 18, 19 and 20 show further details of the two wheel cart wall structure CA. FIG. 18 shows, in solid lines, the cart walls completely folded down and with the wheels 9 and 10 stowed away, i.e., in the nested, inoperable position. The optional wheel support arms 47 are also shown in dashed lines. A resilient interfit is provided, as indicated at 21, between each wheel in its nested position and a portion of the nested left and right side walls 1. The wheels 9 and 10 in the nested position thereof, may resiliently interfit into a fixed base wall ledge 68 as indicated schematically.

FIG. 19 shows details of the left and right exterior side walls 1 including, molded therein, the handle sleeve 6 for the handle 5 which as is also shown, then is lifted to the position shown in dashed lines so as to resiliently snap into the corresponding receptacle sleeves 6.

FIG. 20 shows the movement of the front and rear walls 2 and 3 relative to a side wall 1, shown in dashed lines, wherein protrusions 23 formed along the side edges of the front and rear walls 2 and 3 fit into a respective slide path 24 along each of the side walls as described above. The walls 2 and 3 are shown in dashed lines in their upright wall positions. The front and rear walls 2 and 3 may be pressed or pushed down in front and rear floor channels 80 in the floor of base 4 via sloping terminating grooves 81 at the path upper end points of the slide paths 24. There is a channel and recess 80 along the front and rear of the base 4 of the cart to receive and to allow the front and rear walls 2 and 3 to be pressed down slightly into a locked down position, and all the walls are further retained and stabilized due to the protrusions 23 being pressed into the sloping slide path end points 81. FIGS. 20A and 20B also show alternative methods of supporting the front wall 2 (which is equally applicable to any of the side walls, whether front, rear or side) and although what is shown is for the two wheel cart, these approaches are equally applicable to the four wheel cart. FIG. 20 shows that each front and rear wall 2 or 3 (or the side walls 1) include protrusions 82 which provide a resilient interfit with corresponding recesses molded into the cart base wall 4.

FIG. 21 is a top rear view of the upright rear and front walls 2 and 3, respectively, upright side walls 1, two of the multiple protrusions 23 shown in the upright position in solid lines, and nested down in dashed lines. The handle 5 is shown nested to the exterior of the front and rear walls 2, 3 and side walls 7, and, in this embodiment, extends through a cylindrical sleeve 46 which also supports the wheel support structure 11.

FIGS. 22A, 22B and 22C show details of the underside of the cart base 4 and the kickstand unit 17. (The directional relationship of the kickstand unit to the cart underside may be reversed from that shown here.) In FIG. 22B the kickstand structure 17 includes outwardly projecting protrusions 70 which clear the base wall 4 of the cart, and arm structures 83 (one of which is shown) are provided at the point where a hollow section receives the turn handle arm 18 which extends through an opening (not shown) in the exterior base wall 4.

As shown in FIG. 22A the cart CA has cross members or joints 79 which include respective recesses that enable the kickstand 17 to nest into the underside of base 4. The turn handle 18 has ridges 18a to allow a positive hand grip. FIG. 22C shows an underside cross member 79 (or, alternatively, the outermost wall portion of the base), with a hole 84 that allows the handle arm 71 to extend through the hole 84 to secure the kickstand arm, and to extend further through another "joist" structure 79 where it resiliently holds the kickstand 17 between the underside of support members or joints 79. In FIG. 22C, one cart base underside "joist" member, 79 is shown which includes a number of protrusions or recesses 85 (one of which is shown). The latter correspond with protrusions or recesses in either the underside of the handle 18 and/or via a claw-like portion 86 of the turn handle arm 71 furthest from the handle itself, as more is fully shown in FIGS. 26 and 27. In an alternative embodiment, element 72 shown in dashed lines in FIG. 22A is a portion of kickstand 17 which extends across the underside of the cart base 4 between the kickstand handle portions.

Figure 23:
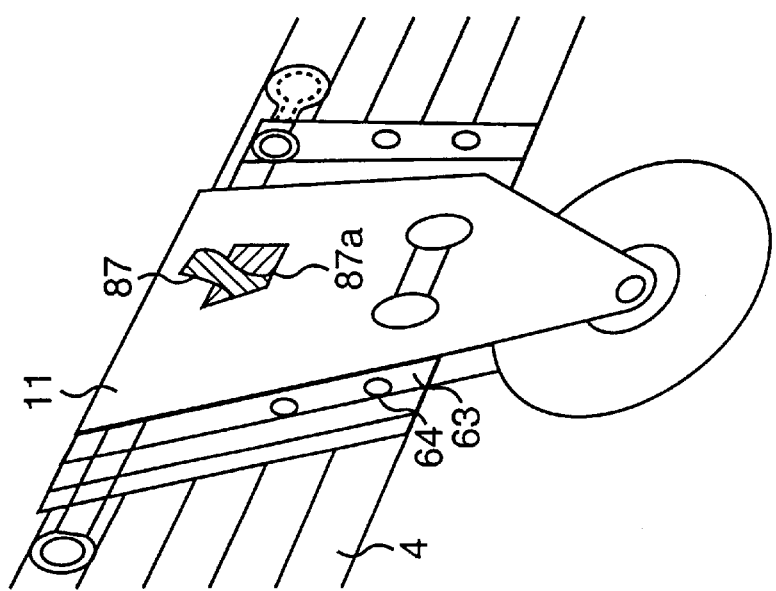
FIG. 23 is a perspective view showing details of a wheel support construction.

FIG. 23 is a perspective side view from the exterior of the cart base 4 of the wheel support structure 11, and illustrates an embodiment wherein a wheel structure support arm 87 extends through the central upper portion of the wheel support structure 11. Support arm 87 can be molded into the cart base wall 4 or be a part of a separate structure, which extends down and interfits with the cart base 4. The wheel structure 11 itself would be constructed with a gap or groove 87a to allow the support arm 82 to pass through the center of the structure. In addition, a plurality 4 of male/female resilient contact points 63 and 64 are provided between the wheel support structure 11 and the cart base wall 4.

FIGS. 24 and 25 show alternative embodiments of the wheel support construction of the invention which include a 360° rotating wheel 30 a wheel support structure 31, a retaining washer 32 and a support arm 33. Referring to FIG. 24 the central longitudinal metal support arm or shaft 33 can extend all the way through structure 31 to be capped by a cap indicated on dashed lines at 34 or the wheel can alternately be constructed with a pass through gap or groove from front to rear and an end cap 88 provided for the longitudinal portion of the wheel support arm 33. FIG. 25 shows the view of the same wheel structure from the side, including a screw and bolt assembly 89 which passes through the wheel support 31, through a pass through in support 31, and which also passes through an eye or opening 90 in the distal end portion of wheel support arm 33. The screw and bolt assembly 89 serves to fixate support arm or shaft 33 so as to prevent the 360° rotation of wheel 30 about the axis formed by arm 33.

Figure 26:
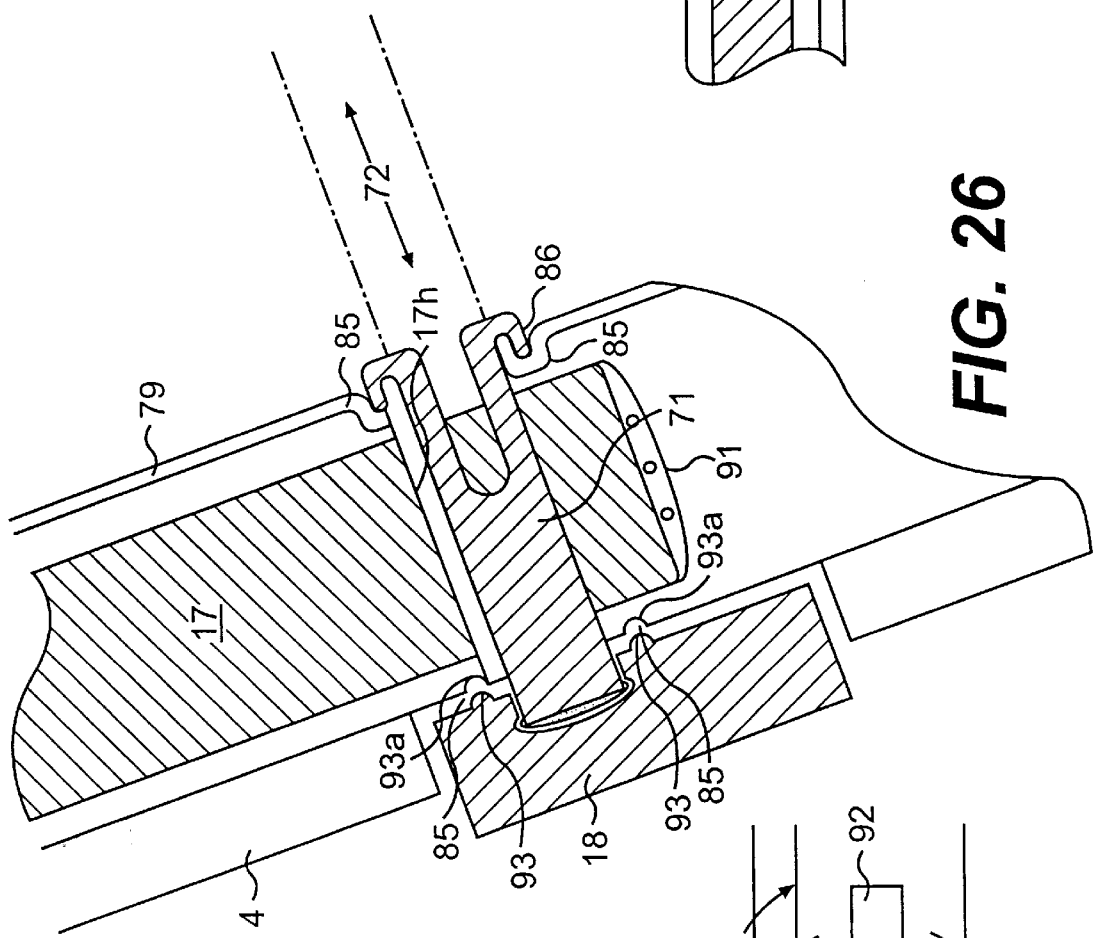
FIG. 26 is a perspective view of a kickstand embodiment.

FIG. 26 shows some details of the kickstand gripping handle 18 described above. Protrusions 93 (and/or recesses) extending from the underside of the handle 18 cooperate with matching recesses 93a (and/or protrusions) molded into the exterior cart base wall 85. Each of the two kickstand arms 17 has a hole 17h through which a handle portion 71 extends. The distal kickstand handle arm end or "claw" end, i.e., the end most distant from the turn handle 18 resiliently clips or holds onto a support member joint 79 molded into the underside of base 4 and also engages matching grooves 85 (or protrusions) in the underside wall joist 79. This kickstand may be alternatively designed with a support member 72 that extends all the way through between the handles. Protrusions or grooves 91 on the free end or "head" of the kickstand arm 17 interfit into corresponding molded areas in the underside of cart base 4 at the point where the arm is in its lowered position (with the "head" portion 91 face up) to further support the kickstand 17 from movement while it is in such recess, locked position.

Figure 27:
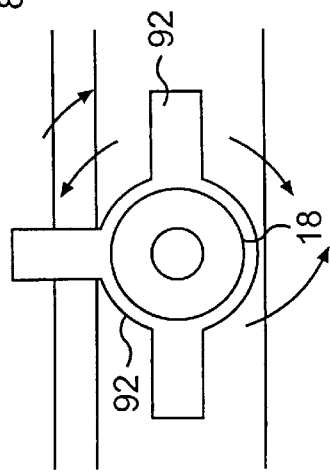

FIG. 27 shows an alternative kickstand turn handle 18 including arms 92.

Figure 28:
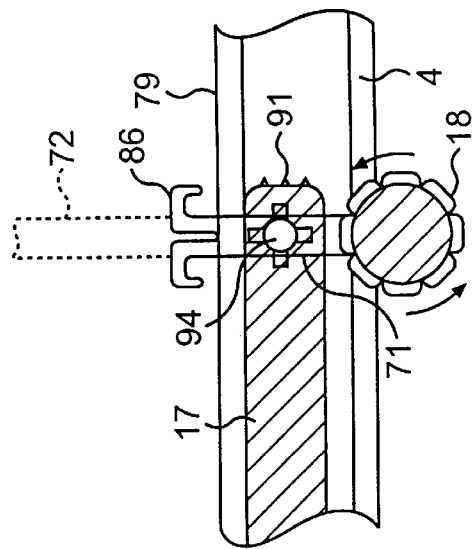
FIGS. 27 and 28 show details of the embodiment of FIG. 26.

FIG. 28 is another view of the kickstand assembly of FIG. 26 including the kickstand arm 17 and the gripping handle 18 which resiliently attaches to the gripping handle arm 71. The latter extends through the kickstand arm 17 and terminates at the claw area 86. As described above, the arm 71 extends through a base underside support joist 79 then resiliently attaches to the same support joint 79, which is molded as part of the underside of the cart base 4. One of the two kickstand arms is shown at 17 and this arm is molded with a slot 94 therethrough. Slot 94 is cylindrical at its center, but may have four cross members as shown, so that when the handle arm 71 is passed therethrough, the slot 94 allows the kickstand arm 17 to be turned to a lowered or raised position. As indicated above, connector 72, shown in dashed lines, is used in the alternative embodiment wherein the kickstand arm 17 extends between the two sides of the cart.

FIG. 29A is a view looking down from inside the well of the cart base 4 toward the space where the wheel support structure interfits into each of the cart base wall cavities 12. This view is a cut-away view of the base wall 95 (indicated by arrows), and for purposes of illustration, omits a portion of the cart base wall in the area extending from the base floor, up to just below the cavity openings 12. The cavities 12 which hold the wheel support structure 11 (shown in dashed lines), have shaped openings 12A which permit the wheel structure arms 11A to be received in the cavity 12 only from the interior side of the cart base wall 4. However, once placed in the cavities 12, the wheel structure 11 is constructed such that the wheel support structure 11 can still then pivot 270° through this opening between the cart walls to a lowered, operable position, as described above. Another phantom view of the wheel structure 11 is shown at the upper right as pivoting outwardly and the central retention insert box 25 is shown in solid lines so as to indicate that when the corresponding wheel 9 is lowered and operable, the central retention insert box 25 interfits resiliently with an engaging means shown at 54 provided in the base wall wheel structure receiving area which is actually just below the cart base area shown. When the wheel support structure 11 is in the lowered and in the "locked" position, the structure 11 forms a flush profile in the base wall 4 between cavities 12. As indicated above, protrusions or recesses 64 can be provided along the side of each cart base wall 4, which interfit and further resiliently hold the wheel support structure 11 in the lowered position.

In the areas of the cart base wall (or along the omitted cart wall between the cavities 12), just beside each cavity opening, a stop element in the form of a molded ledge or protrusion 68 is provided which serves to resiliently connect to a corresponding protrusion or molded portion of the wheel support structure 11 so that when the wheel structure 11 is nested into the cart base 4, the wheel structure 11 cannot move or close further. Thus, element 68 serves as a stop, and also resiliently holds the nested wheel structure 11 in place.

Two resiliently interfitting small wheel arm cavity covers 96 are employed and include protrusions 97 for securing each of the covers 596 into each cavity 12. The covers 96 slide into slide grooves 99 and the protrusion 96 retains the wheel structure arms 11A inside each cavity 12 in the base wall 4.

Alternatively, rather than the two separate covers 96, there can be a single unitary access cover 98 as shown in FIG. 29B which slides in the grooved openings 99 (or resiliently snaps therein) formed in the cart base walls 4 at a low enough profile on the base wall so as to allow the required pivoting of wheel support structure 11, i.e., so that structure 11 can still pivot 270° above same.

FIG. 29B shows another embodiment cavity cover, wherein 11A is the wheel support arm and an access cover 98A, shown in dashed lines and including an inner shaped portion 986 and outwardly extending, flexible locking legs 98C is placed as shown in solid lines, into the base wall area surrounding the cavity 12. The preferred embodiment shown in FIG. 29B avoids the use of screws but it will however, be appreciated that metal screws, or suitable resiliently held "pins", may be used to secure any cavity cover components in place.

FIG. 30 is a side elevation view of an alternative embodiment of the four-wheel folding cart construction wherein the generally "U" shaped handle 5 is employed rather than a center pull handle. The telescoping handle 5, which is shown in the raised position in solid lines and in an even higher position in dashed lines recessed to the exterior of the cart base as shown in the lowest dashed lines, retained by the support arms 19. The telescoping handle is attached at point 8 to the cart base and/or wall by a pin 36 or small arm traveling through the handle to the cart base. The front wheel 9 furthest from the handle is provided with a 360° turning caster wheel structure 100. While this embodiment of the handle and base structure has advantageous features that the handle folds and nests into a relatively flush and thin profile, the U-shaped handle 5 must be raised higher than in the other embodiments in order to allow the rear wheels 9 to pivot 270° back up and onto the cart base 4.

FIG. 31 is a top plan view of the four wheel cart CB and shows center pull handle 27 and all four wheel structures, i.e., the two rotating front wheels 30 and the two rear fixed wheels 9 and 10, extending laterally. Recesses 22 provide a loose interfit with the wheels in their nested position, as shown in the lower right in dashed lines. The handle 27 is shown in dashed lines in the recessed position thereof where the handle 27 is resiliently affixed to a portion 69 of the base at the point closest to the outer edge of the handle 27. The swing out side door 28 is also shown. FIG. 31A shows one embodiment of the handle 27 wherein protrusions 27A are provided to resiliently hold the handle in matching recesses of the front cart base wall.

FIG. 32 shows the closed, nested position of a four wheel cart CB and the manner in which the parts are opened out. The center pull handle 27 shown nested between side walls 1 above the front or rear wall 2 or 3 which is the last part folded upward.

FIG. 33 is a top plan view of the components of the four wheel cart CB in the folded, closed position or state. Grooves 22 provide resilient fit with the respect rotating I support structure 31 and wheels 30 and further grooves 22 provide a similar fit with wheels 9, 10 and corresponding wheel support structures 11. When the user lifts side doors 1 from the base 4 of the cart CB, all four wheels automatically break out of their loose resilient fit with grooves 22, and the user then pivots them and "snaps" them into their stable operable (retained) position as indicated above. An opening 16 through the side wall (and base) provides a hand hold for the user. Gaps 20 extend through the side walls 1 and serve as hand pulls while cart base wall protrusions 69 hold the nested handle 27 (as well as the side walls 1), 2A and 3A are protrusions (or recesses) on the nested front and rear walls which cooperate with corresponding structures on the handle 27 to resiliently hold the handle 27 in its nested position. The swing out door 28 hinged onto one of the side walls 1 is also shown.

Figure 35:
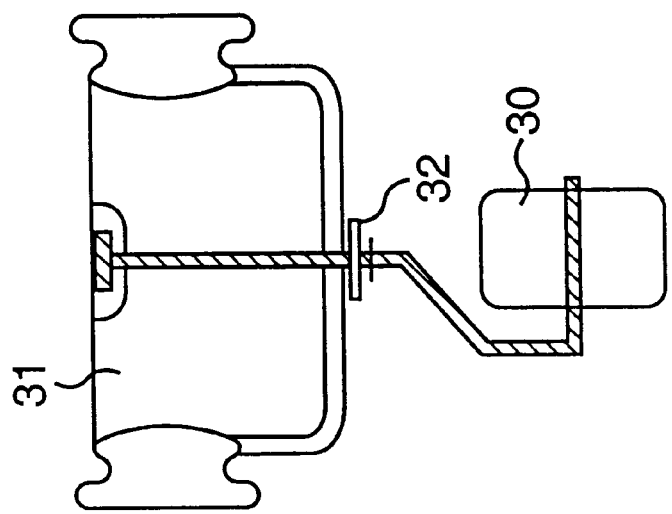
FIGS. 34 and 35 show embodiments of the rotatable wheel construction.
Figure 34:
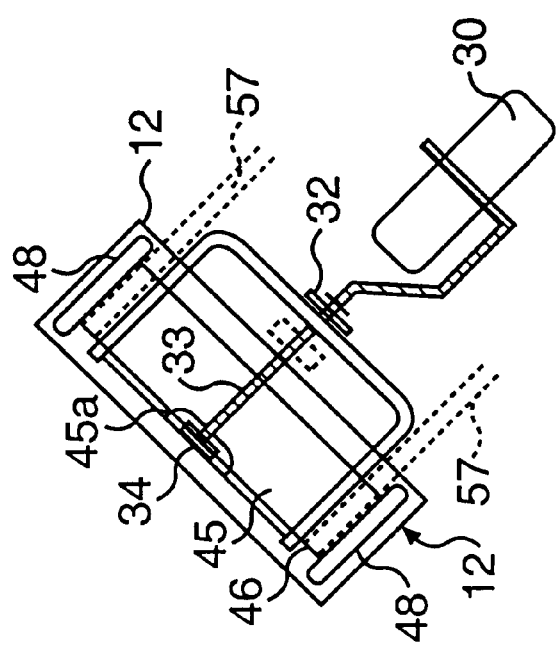

FIGS. 34 and 35 show two embodiments of the front wheel support structure for the four wheel cart, which allow 360° turning of the respective wheels 30. FIG. 34 shows a construction where a non-unitary wheel support structure is employed, and an end cap 34 is secured after placement of a washer (not shown) in a recessed area 45a of the top of the wheel support 45 and a longitudinal metal wheel support arm or support shaft 33 extends down to a further washer 32. End caps 48 close off the support sleeve or cylinder 46 which extends through the hollow upper area of the non-unitary wheel support structure 45 as described above. As was also described previously, the entire wheel support structure interfits into a matching cavity 12 molded out of the base wall itself and indicated in dashed lines The wheel support arms 57 are shown in dashed lines and as described above can be constructed in several ways as indicated previously using elements 47A or elements 56 which were described above, and which are not shown here. The separate wheel support arm structures 46 and 48 can be eliminated entirely, if desired, in an alternative unitary, one piece embodiment of the wheel support arm structure shown in FIG. 35.

FIG. 36 shows an alternative two wheel cart embodiment, commonly referred to as a hand cart and denoted DC. The embodiment shown includes a tubular (or similar) "lower" frame structure made of aluminum, or other suitable metal or plastic generally indicated at 101. Wheel support arms 102 include uppermost spaced elements 102a which are hollow and cylindrical and which slide on to the "upper" frame at 103. Elements 102a are preferably retained in position by suitable sleeves (not shown) which are held in place with pin screws (not shown) which extend into the frame 103. Multiple protrusions or clamp like extensions 104 on the wheel support arms 102 extend inwardly toward the frame structure 101 and provide a retention means between the wheel support arms 102 and the lower section of the frame 101 at such time as the wheel is pivoted 270° from the axis point along upper frame 103 to the lowered, operable position.

FIG. 36A shows the wheel structure arm pivot point or pivot axis 105, as well as the lower frame structure 101, and the retention clamps 104. The cart wheel structure may employ either a two sided support for the wheel 9, as shown in FIG. 36A, or a single sided support for the wheel (see FIG. 3F above), with the single sided support either closest to the frame or cart side of the wheel or vice-versa.

FIG. 36 also shows the generally "U" shaped handle 5 which nests inside of the lower portion of the frame section 101. The handle 5 may be telescoped or extended out to the dashed line position shown. A cargo tray 106 of the hand cart HC, is adapted to pivot and nest down into the lower section of the frame 101, as indicated in dashed lines. The cargo tray 106a pivots along an axis 107. As shown in FIG. 36B, the cargo carrier or tray 106 meets a stop 108 which is formed by a portion of the lower frame member 101. Alternatively, stop 108 can be separate part 109 retained in place on the frame via a screw pin, 10 or as shown in FIG. 36C.

FIG. 37 is a top plan view which shows the cargo carrier or tray 106 in the nested state, the 270° pivoting wheel supports 102 in their nested position, and the handle 5 also nested as shown in solid lines with the extended handle shown in dashed lines. The handle 5 actually nests inside the tubular (or similar) lower frame structure 101.

FIG. 38 shows the nested position of a wheel 9, the foot of tray 106, and of the handle 5. In dashed lines, the wheel structure 102 is shown pivoting from the operative position of the wheel structure. FIG. 38 also indicates the retention means for securing the wheel support structure 102 to the lower frame 101.

FIG. 39 is a top plan view showing the cargo carrier or tray 106 which includes a cylindrical or hollow portion 106A, to allow a lower frame cross member or arm 101A to extend through the tray cylinder 106A, as well as through two pass-through openings 101B in the lower frame 101, whereby end caps or screw-in pieces 111 close off the cross members 101A. The wheel support structures are indicated at 102 wherein, for illustration purposes, the wheels are omitted.

FIG. 40 shows the wheel structures 102 are mounted on one upper frame arm 103A and the manner of assembly of some components. The wheel structure 102 is slid on to upper frame arm 103A before the same is recessed into an upper frame socket 112 and after these parts are secured, an end cap 113 is inserted in position in the end arm 103A. In this embodiment suitable stability sleeves 114 are placed on either side of the wheel structure 102 in order to retain the pivoting when structure 102 in place should a tubular frame be used. As indicated in dashed lines, the cross member 103A around which the foot or tray sleeve (not shown) is slid and is then secured in place with any suitable end cap configuration indicated by end caps 111. The preferred hand cart embodiment described above uses a frame-like upper and lower structure, although each "side" of the frame may alternatively be constructed of solid plastic or metallic materials without any separate upper and lower frame structure, yet still provide the same basic two wheeled hand cart construction compatible with the basic features disclosed herein.

Figure 42:
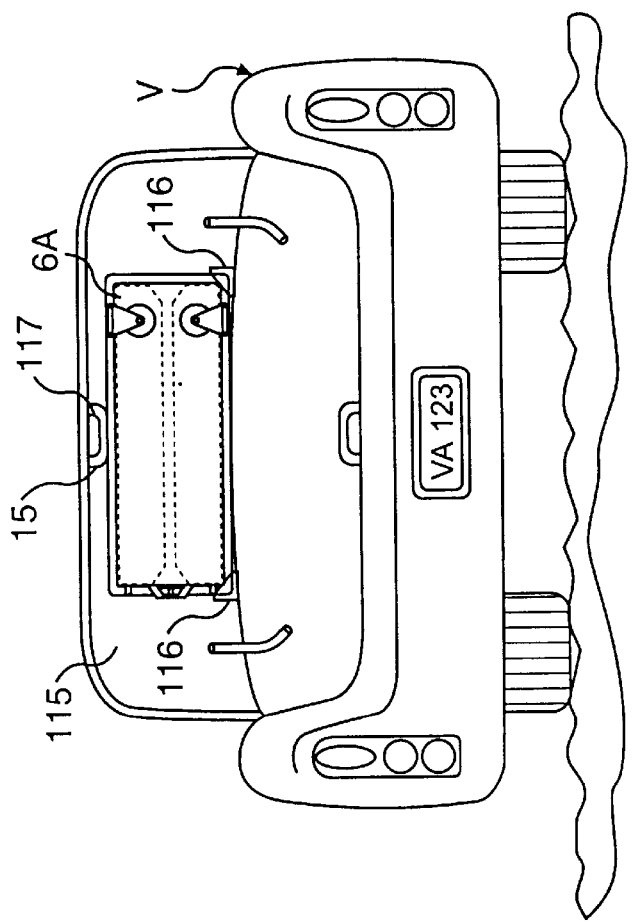
FIG. 42 is a schematic representation of an alternative method of cart storage.
Figure 41:
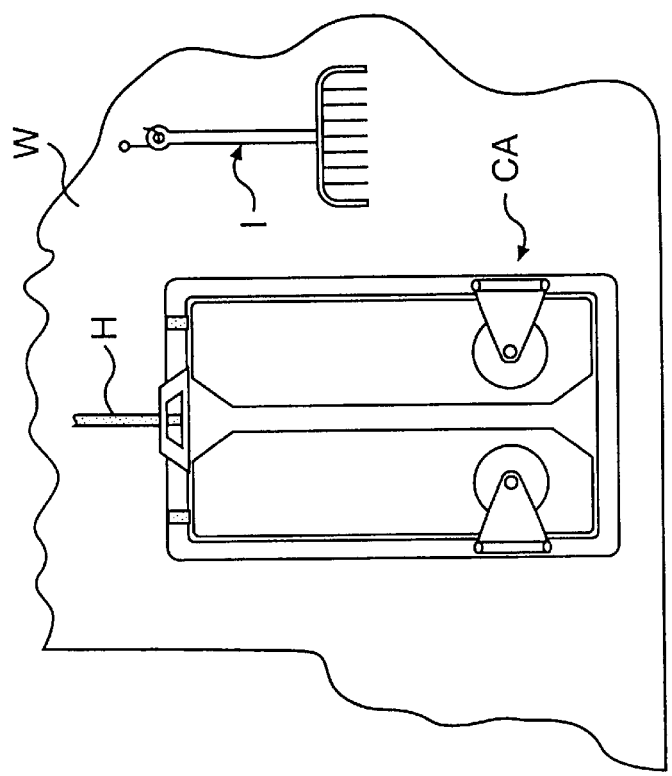
FIG. 41 is a schematic representation of a stored cart.

FIGS. 41 and 42 show storage methods or techniques for the folding cart. FIG. 41 shows one of numerous potential wall storage methods using a hook H mounted on a wall W with another implement indicated at 1. FIG. 42 shows the cart CA (or any of the other carts discussed above) retained in the underside of an open vehicle trunk lid 115 of a vehicle V wherein a series of retaining arms or elements 116 hold the corners of the carts CA, and one of the tapered carry handles 15 is resiliently held to the lid via resilient cooperation with any portion of the trunk lid 115. Given that one of the main objects of this invention is to create a thin profile folding cart, it is apparent that any of the folded, nested carts described above can be fitted to be stored and nested along any flat surface, such as a vehicle trunk lid, hatch or door, whether similar or different to that disclosed in FIG. 42, or even inside a custom created slot or groove manufactured inside the vehicle lid or door or other accessible structure.

Although the invention has been described above in relation to preferred embodiments thereof, it will be understood by those skilled in the art that variations and modifications can be effected in these preferred embodiments without departing from the scope and spirit of the invention.

What is claimed is:

1. A wheeled carrier device comprising:
   a base member;
   a plurality of foldable walls supported on said base member and movable between an erected state wherein said walls define a carrier space and a collapsed state wherein the walls are folded on top of said base member;
   at least two wheels; and
   wheel mounting means for pivotably mounting said at least two wheels on said device on opposite sides thereof such that the at least two wheels are movable through 270° from a first, operative position wherein the wheels support the carrier device and a second, inoperative position wherein the wheels are folded so as to overlie said base member in the collapsed state of the walls.

2. A wheeled carrier device according to claim 1 wherein said base member includes a fixed peripheral wall and said device further comprises a handle pivotably connected to said peripheral wall and movable between an operative state wherein said handle can be used to pull the carrier device and an inoperative state wherein said handle is stowed in substantially flush relation with the remainder of the carrier in the collapsed state of said walls.

3. A wheeled carrier device according to claim 1 wherein said walls comprise first and second spaced, parallel walls and third and fourth spaced, parallel walls extending orthogonally to said first and second walls, said first and second walls each having an inwardly facing surface including at least one curved channel therein at each end thereof extending between side and bottom edges thereof, and said third and fourth walls including projecting elements received in said channels and movable along said channels so as to be guided thereby during a downward folding movement of said third and fourth walls to collapsed positions wherein said third and fourth walls fold down on said base member.

4. A wheeled carrier device according to claim 1 wherein said wheel mounting means includes a wheel support member including support means including oppositely extending mounting portions and said base member of said carrier device includes spaced, opposed cavities therein in which said mounting portions are pivotably received.

5. A wheeled carrier device according to claim 1 wherein said carrier device has two wheels and said carrier device further comprises an erectable support element affixed to said carrier device in spaced relation to said two wheels for, when erected, supporting the base member of the carrier device in a substantially horizontal position.

6. A wheeled carrier device according to claim 1 further comprising an erectable tray element for, when erected, providing a support surface, said tray element including means for receiving a drink container.

7. A wheeled carrier device according to claim 1 further comprising means defining an elongate storage space at one end of said device for stowing a mesh receptacle for storing the device with the walls in the collapsed state thereof and the wheels in the inoperative position thereof.

8. A wheeled carrier device according to claim 1 wherein said cart has four wheels and wherein two of said wheels, in the operative state thereof, are rotatable through 360° beneath said base member.

9. A wheeled carrier device according to claim 1 wherein said base member includes a peripheral frame and said wheel mounting means includes at least two pivot shafts disposed within said peripheral frame on opposite sides thereof about which pivot respective wheels of said at least two wheels.

10. A wheeled carrier device according to claim 1 wherein said mounting means includes resilient releasable retaining means for retaining said wheels in the operative position thereof.

11. A wheeled carrier device according to claim 1 wherein said mounting means includes spring biased retaining means for retaining said wheels in the operative position thereof.

12. A wheeled carrier device according to claim 1 wherein said mounting means includes a spring biased retaining means for retaining said wheels in the operative position thereof and in the inoperative position thereof.

13. A wheeled carrier device according to claim 1 wherein said wheel mounting means for at least one of said wheels includes a wheel mounting member and a support axle mounted on said wheel mounting member so as to enable rotation of said at least one wheel about an axis defined by said support axle.

14. A wheeled carrier device according to claim 1 wherein at least one said wheel mounting means includes means for resiliently affixing the at least one wheel mounting means to said base member so as to permit selective removal thereof from said base member.

15. A wheeled carrier device according to claim 1 wherein at least one of said folding walls includes means for resiliently affixing the at least one wall to said base member so as to permit selective removal thereof from said base member.

16. A wheeled carrier device according to claim 2 wherein said handle comprises a substantially U-shaped handle member including parallel arms pivotably connected to the carrier device.

17. A wheeled carrier device according to claim 2 wherein said handle comprises an elongate handle member pivotably connected to one end of said peripheral wall and movable to a folded down storage position wherein said handle extends longitudinally of said carrier device on top of said end walls and between said side walls in the collapsed state of said walls.

18. A wheeled carrier device according to claim 2 wherein said peripheral wall further comprises means for retaining said handle in the inoperative state thereof.

19. A wheeled carrier device according to claim 2 wherein said handle includes means for resiliently affixing said handle to said base member so as to permit selective removal thereof from said base member.

20. A wheeled carrier device according to claim 16 wherein said foldable walls include side walls and said side walls each include handle receiving means for supporting the parallel arms in the operative state of said handle.

21. A wheeled carrier device according to claim 16 wherein said parallel arms of said U-shaped handle member comprise telescoping arm elements which telescope between an extended position in the operative state of said handle and a retracted position in the inoperative state of said handle.

22. A wheeled carrier device according to claim 20 wherein said handle member further comprises releasable means for retaining the telescoping arm elements in the retracted state thereof.

23. A wheeled carrier device according to claim 17 wherein said peripheral wall further comprises means for retaining said handle in the inoperative state thereof.

24. A wheeled carrier device according to claim 4 wherein said wheel mounting means includes manually operable releasable means for retaining said at least two wheels in the operative position thereof.

25. A wheeled carrier device according to claim 4 wherein said support means includes a cylindrical pivot element received in a transverse opening in said support member and said mounting portions comprise opposite ends of said pivot element.

26. A wheeled carrier device according to claim 4 wherein said mounting portions comprise oppositely extending mounting elements affixed to said wheel support member.

27. A wheeled carrier device according to claim 5 wherein said erectable support element comprises a U-shaped support member including support arms pivotably connected to said base member and pivotable to a nested position with respect to said base member.

28. A wheeled carrier device according to claim 8 wherein said wheel mounting means for each of said two wheels includes a wheel mounting member and a support axle mounted on said wheel mounting member so as to provide said 360° rotation of a respective one of said two wheels about an axis defined by said support axle.

29. A wheeled carrier device according to claim 9 wherein said base member includes a bottom member and said peripheral frame comprises a wall extending upwardly from said bottom member, said at least two pivot shafts being mounted in opposed portions of said wall.

30. A wheeled carrier device according to claim 9 wherein said peripheral frame is of a height defining the side elevational profile of the carrier device and said wheels lie with said profile in the inoperative position thereof.

31. A wheeled carrier device according to claim 10 wherein said each of said mounting means includes a movable mounting member to which a respective wheel is affixed and each said resilient retaining means comprises a resilient male-female connection between said movable mounting member and a fixed member of the carrier.

32. A wheeled carrier device according to claim 10 wherein each of said mounting means comprise a movable mounting member to which a respective wheel is affixed and each said resilient retaining means comprising a spring biased retaining element.

33. A wheeled carrier device according to claim 11 wherein said retaining means includes at least one retaining element including a finger grip for controlling movement of the retaining element between a retaining position and a release position.

34. A wheeled carrier device according to claim 33 wherein said retaining means includes a pair of oppositely disposed retaining elements and a corresponding pair of finger grips for controlling movement of the respective retaining elements between a retaining position and a release position.

35. A wheeled carrier device according to claim 13 wherein said wheel mounting means for said at least one wheel includes means for fixating said support axle so as to prevent rotation of said at least one wheel.

36. A wheeled carrier device according to claim 13 wherein said wheel mounting member includes a cylindrical pivot element received in a transverse opening in said wheel mounting member.

37. A wheeled carrier device according to claim 13 wherein said wheel mounting member includes a central longitudinal through hole through which said support shaft extends and a recess in one surface thereof in commuication with said through hole, said device further comprising an end cap disposed in said recess and connected to one end of said support shaft, the other end of said support shaft being connected to said at least one wheel.

38. A wheeled carrier device according to claim 13 wherein said wheel mounting means for said at least one wheel includes releasable means for fixating the position of the at least one wheel about said axis defined by said support axle and for, when released, permitting 360° rotation of the at least one wheel about said axis.

* * * * *